(12) United States Patent
Kong et al.

(10) Patent No.: US 12,526,172 B2
(45) Date of Patent: Jan. 13, 2026

(54) VOLTAGE MODE DRIVER FOR HIGH-PERFORMANCE AND LOW-POWER CO-EXISTENCE

(71) Applicant: QUALCOMM Incorporated, San Diego, CA (US)

(72) Inventors: Xiaohua Kong, San Diego, CA (US); Xiaobo Hou, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 113 days.

(21) Appl. No.: 18/444,027

(22) Filed: Feb. 16, 2024

(65) Prior Publication Data
US 2025/0267044 A1 Aug. 21, 2025

(51) Int. Cl.
*H04L 25/02* (2006.01)
*G06F 13/40* (2006.01)
*G06F 13/42* (2006.01)
*H03K 19/0185* (2006.01)
*H04L 25/03* (2006.01)

(52) U.S. Cl.
CPC ........ *H04L 25/026* (2013.01); *G06F 13/4072* (2013.01); *G06F 13/4282* (2013.01); *H04L 25/0272* (2013.01)

(58) Field of Classification Search
None
See application file for complete search history.

(56) References Cited

U.S. PATENT DOCUMENTS

| | | | |
|---|---|---|---|
| 11,139,843 B1 * | 10/2021 | Li | H03K 19/018521 |
| 11,431,530 B2 * | 8/2022 | Chong | H04L 25/03878 |
| 2013/0278296 A1 * | 10/2013 | Amirkhany | H03K 19/018521 |
| | | | 327/108 |
| 2019/0288880 A1 | 9/2019 | Elzeftawi et al. | |
| 2023/0198562 A1 * | 6/2023 | Poon | H04B 1/0483 |
| | | | 455/91 |
| 2023/0253975 A1 * | 8/2023 | Hsieh | H03M 1/0863 |
| | | | 341/144 |

FOREIGN PATENT DOCUMENTS

WO WO-2018026578 A1 2/2018

OTHER PUBLICATIONS

Partial International Search Report—PCT/US2025/010668—ISA/EPO—May 8, 2025.
International Search Report and Written Opinion—PCT/US2025/010668—ISA/EPO—Jul. 14, 2025.

* cited by examiner

*Primary Examiner* — Anh Q Tran
(74) *Attorney, Agent, or Firm* — Loza & Loza, LLP

(57) ABSTRACT

A voltage mode driver circuit has a first driver slice has a pullup structure that includes a first transistor and a second transistor and a pulldown structure that includes a third transistor and a fourth transistor. The first transistor has a gate that receives a first version of a first data signal. The second transistor has a gate that receives a first version of a second data signal. The third transistor has a gate that receives a second, complementary version of the first data signal. The fourth transistor has a gate that receives a second, complementary version of the second data signal. The first data signal encodes data in a first mode and enables the pullup and pulldown structures in a second mode of operation. The second data signal encodes data in the second mode of operation and enables the pullup and pulldown structures in the first mode of operation.

14 Claims, 11 Drawing Sheets

VOLTAGE MODE DRIVER FOR HIGH-PERFORMANCE AND LOW-POWER CO-EXISTENCE

TECHNICAL FIELD

The present disclosure generally relates to driver circuits in a serializer/deserializer (SERDES) or double data rate interface and more particularly to a driver circuit that can be shared by high-power and low-power physical layer circuits.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high-speed bus interface for communication of signals between hardware components. For example, the high-speed bus interface may be implemented using a Peripheral Component Interconnect Express (PCIe) bus, Universal Serial Bus (USB) or Serial Advanced Technology Attachment (SATA), among others.

IC devices may include a serializer/deserializer (SERDES) to transmit and receive through a communication link. In high-speed applications, timing of the operation of a SERDES may be controlled by multiple clock signals. The use of multiple increased frequency clock signals results in increased power consumption. Furthermore, the SERDES generally operates using clock signals that have the same frequency but different phases. Performance, accuracy or reliability of the SERDES may depend on frequency and the phase relationships of the clock signals and drift or other variations in the phase relationships of clock signals can result in errors in received or transmitted data. Therefore, there is an ongoing need for new techniques that provide reliable lower-power clock generation and calibration circuits for components used to receive clock signals over high-speed serial links.

In certain implementations, a high-speed serial bus interface may be configurable for different modes of communication. For example, integrated circuit (IC) devices that include memory interfaces have physical layer circuits may be expected to operate in one or more high-speed data communication modes and one or more low-speed data communication modes. Different signaling voltages may be defined for high-speed and low-speed data communication modes. Increased demands for higher data rates require increasingly tight timing between circuits within the memory interface in order to ensure integrity of the data and clock signals between memory controller and memory devices.

Performance, accuracy and/or reliability of data communication interfaces may depend on the flexibility and reliability of driver circuits that are expected to accommodate changes in transmission speed, supply voltage variances and other factors that can impact the operation of high-speed data links. Therefore, there is an ongoing need for improvements that provide reliable transmission of clock, data and control signals over high-speed data links at different speeds and using a variety of power supply voltages.

SUMMARY

Certain aspects of the disclosure relate to systems, apparatus, methods and circuits that can be used in high-performance and low-power modes without coexistence issues.

In various aspects of the disclosure, a voltage mode driver circuit has a first driver slice that includes a first transistor, provided in a pullup structure that is coupled to an output of the first driver slice, the first transistor having a gate configured to receive a first version of a first data signal; a second transistor, provided in the pullup structure, the second transistor having a gate configured to receive a first version of a second data signal; a third transistor, provided in a pulldown structure that is coupled to the output of the first driver slice, the third transistor having a gate configured to receive a second version of the first data signal that is a complement of the first version of the first data signal; and a fourth transistor, provided in the pulldown structure, the fourth transistor having a gate configured to receive a second version of the second data signal that is a complement of the first version of the second data signal. The first data signal may encode data in a first mode of operation and may enable or disable the pullup structure and the pulldown structure in a second mode of operation. The second data signal may encode data in the second mode of operation and may enable or disable the pullup structure and the pulldown structure in the first mode of operation.

In various aspects of the disclosure, an apparatus includes an apparatus includes means for providing a first data signal to a first slice of a voltage mode driver. A first version of the first data signal may be provided to a gate of a first transistor that is provided in a pullup structure coupled to an output of a first driver slice of the voltage mode driver circuit. A second version of the first data signal may be provided to a gate of a third transistor that is provided in a pulldown structure coupled to the output of the first driver slice. The apparatus may include means for providing a second data signal. A first version of the second data signal may be provided to a gate of a second transistor that is provided in the pullup structure and a second version of the second data signal may be provided to a gate of a fourth transistor that is provided in the pulldown structure. The first data signal may be used to encode data in a first mode of operation and to enable or disable the pullup structure and the pulldown structure in a second mode of operation. The second data signal may be used to encode data in the second mode of operation and to enable or disable the pullup structure and the pulldown structure in the first mode of operation.

In various aspects of the disclosure, a method for operating a voltage mode driver circuit includes providing a first version of a first data signal to a gate of a first transistor that is provided in a pullup structure coupled to an output of a first driver slice of the voltage mode driver circuit, providing a first version of a second data signal to a gate of a second transistor that is provided in the pullup structure, providing a second version of the first data signal to a gate of a third transistor that is provided in a pulldown structure coupled to the output of the first driver slice, providing a second version of the second data signal to a gate of a fourth transistor that is provided in the pulldown structure, using the first data signal to encode data in a first mode of operation and to enable or disable the pullup structure and the pulldown structure in a second mode of operation, and using the second data signal to encode data in the second mode of operation and to enable or disable the pullup structure and the pulldown structure in the first mode of operation.

In certain aspects, the voltage mode driver circuit has a second driver slice that includes a pullup structure responsive to an in-phase version of the first data signal and an in-phase version of the second data signal, and a pulldown structure responsive to a quadrature version of the first data signal and a quadrature version of the second data signal. An output of the second driver slice may be coupled to the output of the first driver slice.

In certain aspects, the voltage mode driver circuit has an ESD protection circuit coupled to the output of the first driver slice. In certain implementations, the voltage mode driver circuit includes a first serializer configured to provide the first data signal based on timing provided by a first clock signal generated by a first clock generator, and a second serializer configured to provide the second data signal based on timing provided by a second clock signal generated by a second clock generator.

In certain aspects, the first data signal is gated by an enable signal during the second mode of operation. The second data signal may be gated by the enable signal during the first mode of operation. The enable signal may determine whether the pullup structure and the pulldown structure are to be disabled in a current mode of operation.

In certain aspects, data is transmitted by the voltage mode driver circuit at a higher data rate in the first mode than in the second mode of operation. In one example, data is transmitted by the voltage mode driver circuit at 18 gigabits per second in the first mode of operation and at 9 gigabits per second in the second mode of operation.

DETAILED DESCRIPTION

Figure 1:
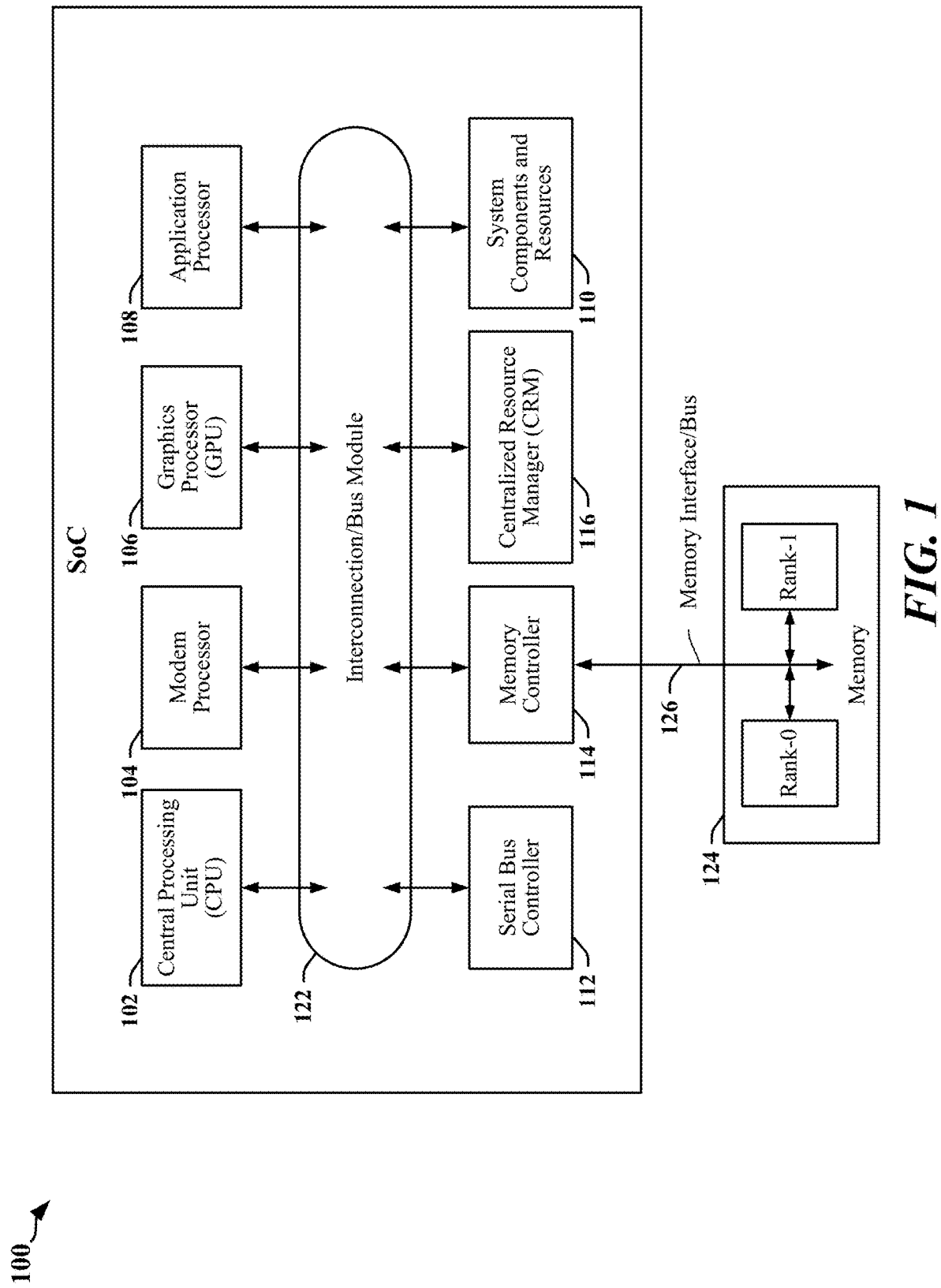
FIG. 1 illustrates an example of a system-on-a-chip (SOC) that may be adapted in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, notebooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

ICs typically provide multiple voltage domains for power saving purposes. For example, higher voltage domains provide power at higher voltage levels than lower voltage domains. Higher voltage domains are sometimes needed for interfacing with external devices, while core logic circuits can generally operate at the lower voltage levels available in lower voltage domains. For the purposes of this disclosure, a thick-oxide transistor may refer to a transistor that has a gate oxide thickness sufficient to enable the transistor to withstand and operate at the higher voltage levels in higher voltage domains and a thin-oxide transistor may refer to a transistor that has a gate oxide thickness that is insufficient to avoid electrical overstress when the transistor spans a higher voltage level in the higher voltage domains. In certain examples disclosed herein, a thin-oxide transistor may be rated for voltages up to 0.6 volts and a thick-oxide transistor may be rated for voltages greater than 0.6 volts and thick-oxide transistors may be used in a higher a high-voltage domain that provides power at 1.2 volts.

Certain circuits are illustrated in this disclosure as being implemented using combinations of P-type metal-oxide-semiconductor (PMOS) transistors and N-type metal-oxide-semiconductor (NMOS) transistors. These circuits are provided by way of example only, and it is contemplated that the concepts disclosed herein can be implemented in circuits that use different combinations of NMOS and PMOS transistors. Circuits that include NMOS and PMOS transistors are typically coupled to the rails of a power supply. The power supply provides a current that flows from a higher voltage rail to a lower voltage rail. A rail may include some combination of conductors, wires, connectors and other types of interconnect. For the purposes of this description, the higher voltage rail may be referenced as "VDD" or "$V_{DD}$" and the lower voltage rail may be referred to as Ground. In some implementations, power may be provided to certain circuits through more than two rails.

Advancements in process technologies tend to reduce transistor gate length and other feature sizes with IC devices. Reductions in gate length and feature sizes can increase the susceptibility of IC devices to electrostatic discharge (ESD) events. IC devices often include ESD protection circuits that can protect interface circuits during different types of ESD events. IC devices may be tested to ensure that they meet minimum industry standards regarding ESD protection. IC device qualification processes may include testing the susceptibility of the IC device to ESD events based on a human-body model (HBM) or based on a charged-device model (CDM) characterization of ESD events. Some ESD protection circuits are based on or evaluated using an HBM or a CDM. The HBM is intended to characterize the susceptibility of devices to damage from ESD events of ±1 kVolt resulting from human touching of an electronic device. The CDM is intended to characterize the susceptibility of devices to damage from ESD events of ±250 Volts that relate to sudden discharges of energy accumulated in an IC chip or package through direct contact charging or field-induced charging.

FIG. 1 illustrates examples of components and interconnections in a system-on-chip (SoC) 100, including a memory interface/bus 126, that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include interface circuits that support inter-processor communication and/or communication between one or more of the processors 102, 104, 106, 108, memory, wireless modems, and other peripherals. Many of these interface circuits are based on serializer/deserializer (SERDES) circuits that enable transmission and reception of data over a communication link. SERDES circuits may be used to support high-speed and low-speed communication.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high-performance networks on chip.

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously.

The memory controller 114 may be a specialized hardware module configured to manage the flow of data to and from a memory 124 via the memory interface/bus 126. In some examples, the memory controller 114 includes one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Certain aspects of the disclosure are applicable to data communication interfaces that include SERDES circuits. For example, SERDES-based data communication interfaces may be used in communication links operated in accordance with Peripheral Component Interconnect Express (PCIe) or USB protocols, and in Advanced High-Performance Bus (AHB) protocols defined by Advanced Microcontroller Bus Architecture (AMBA) specifications. SERDES-based data communication interface may be used to provide an interface between core circuits and Synchronous Dynamic Random Access Memory (SDRAM) devices, including Low-Power double data rate SDRAM (LPDDR SDRAM) that can be configured for high-speed and low-power modes of operation.

Figure 2:
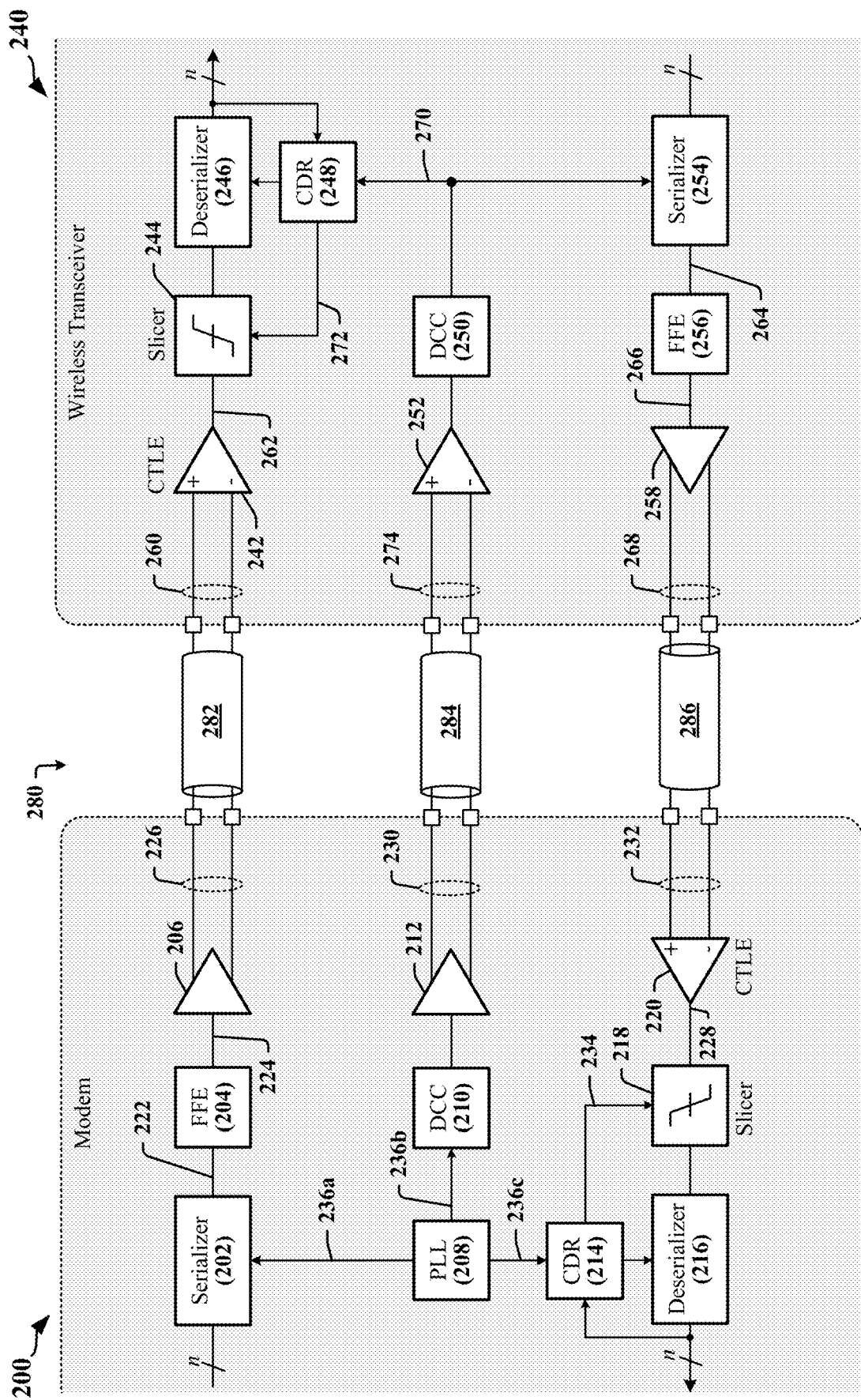
FIG. 2 illustrates an example of a system that employs a multi-channel data communication link.

FIG. 2 illustrates an example of a system that employs a SERDES-based multi-channel data communication link 280 to couple a modem 200 with a wireless transceiver 240. The data communication link 280 includes data channels 282 and 286 and a clock channel 284 that provide a transmission medium through which signals propagate between devices. In the illustrated example, a modem 200 transmits data in a first signal over a first data channel 282 to a wireless transceiver 240 and receives data in a second signal transmitted over a second data channel 286. Data signals are transmitted over the data channels 282 and 286 in accordance with timing information provided by a bus clock signal 230 transmitted over the clock channel 284.

The modem 200 may include a serializer 202 configured to convert n-bit parallel data elements, bytes or words into a serial data stream for transmission in a transmit data signal 222 over the first data channel 282. The transmit data signal 222 may be preconditioned by a pre-equalizing circuit, such as the illustrated digital feed-forward equalizer (the FFE 204), in order to combat or compensate for signal distortions attributable to inter-symbol interference (ISI), reflection and other effects that can be expected to limit bandwidth in first data channel 282. The preconditioned transmit data signal 224 output by the FFE 204 is provided to a driver circuit 206 that is configured drive the first data channel 282.

The modem 200 may include a serializer 202 configured to convert n-bit parallel data elements, bytes or words into a serial data stream for transmission in a serialized data signal 222. The serialized data signal 222 may be preconditioned by a pre-equalizing circuit, such as the illustrated digital feed-forward equalizer (the FFE 204), in order to combat or compensate for signal distortions attributable to inter-symbol interference (ISI), reflection and other effects that can be expected to limit bandwidth in the first data channel 282. A preconditioned data signal 224 output by the FFE 204 is provided to a driver circuit 206 that is configured generate and transmit a differential transmit data signal 226 over the first data channel 282. For the purposes of this disclosure, a differential signal includes two complementary signals that are phase-shifted by 180° with respect to one another.

The wireless transceiver 240 can be configured to process a data signal 260 received over the first data channel 282. The data signal 260 may be provided to a differential receiver 242, which may include or cooperate with an equalizing circuit. In one example, continuous time linear equalization (CTLE) may be used to compensate for certain losses experienced in the first data channel 282. The first data channel 282 may be characterized in some respects as a low-pass filter. In the illustrated example, the differential receiver 242 outputs an equalized data signal 262 that is sampled by a slicer 244. The slicer 244 may be implemented using a D-flipflop or the like and may be configured to capture signaling state of the equalized data signal 262 under the control of edges in a sampling clock signal 272 generated by a clock and data recovery (CDR) circuit 248. The output of the slicer 244 may be provided to a deserializer 246 that is clocked in accordance with one or more clock signals provided by the CDR circuit 248. The CDR circuit 248 may be configured to delay or phase shift a receiver clock signal 270 to ensure that edges in the sampling clock signal 272 are timed to optimize sampling reliability.

In the illustrated wireless transceiver 240, the receiver clock signal 270 is derived from a received bus clock signal 274 from the clock channel 284. A differential receiver 252 coupled to the clock channel 284 may be configured to equalize the received bus clock signal 274, and a duty cycle correction circuit 250 may be used to adjust the duty cycle of the receiver clock signal 270. The receiver clock signal 270 is provided to a serializer 254 that is configured to convert n-bit parallel data elements, bytes or words into a serial data stream for transmission in a serialized data signal 264. The serialized data signal 264 may be preconditioned by a pre-equalizing circuit, such as the illustrated FFE 256, in order to combat or compensate for signal distortions attributable to ISI, reflection and other effects that can be expected to limit bandwidth in the second data channel 286. A preconditioned data signal 266 output by the FFE 256 is provided to a driver circuit 258 that is configured generate and transmit a differential transmit data signal 268 over the second data channel 286.

The illustrated modem 200 can be configured to process a data signal 232 received over the second data channel 286. The data signal 232 may be provided to a differential receiver 220, which may include or cooperate with an equalizing circuit. In one example, CTLE may be used to compensate for certain losses experienced in the second data channel 286. The second data channel 286 may be characterized in some respects as a low-pass filter. In the illustrated example, the differential receiver 220 outputs an equalized data signal 228 that is sampled by a slicer 218. The slicer 218 may be implemented using a D-flipflop or the like and may be configured to capture signaling state of the equalized data signal 228 under the control of edges in a sampling clock signal 234 generated by a CDR circuit 214. The output of the slicer 218 may be provided to a deserializer 216 that is clocked in accordance with one or more clock signals provided by the CDR circuit 214. The CDR circuit 214 may be configured to delay or phase shift a transmitter clock signal to ensure that edges in the sampling clock signal 234 are timed to optimize sampling reliability.

A clock generation circuit, including the illustrated phase locked loop 208, may generate multiple clock signals 236a, 236b, 236c used by the modem 200. One or more of the clock signals 236a, 236b, 236c may be a divided version of a base clock signal generated by the PLL 208. One or more of the clock signals 236a, 236b, 236c may be phase shifted with respect to the base clock signal. In one example, the serializer 202 may produce the serialized data signal 222 using timing provided by a first clock signal 236a. In another example, the bus clock signal 230 transmitted over the clock channel 284 may be derived from a second clock signal 236b. In some instances, a duty cycle correction circuit 210 may be used to adjust the duty cycle of the second clock signal 236b and to provide an input to a driver circuit 212 that is configured drive the clock channel 284. In another example, the CDR circuit 248 may generate the sampling clock signal 234 from a third clock signal 236c.

Figure 3:
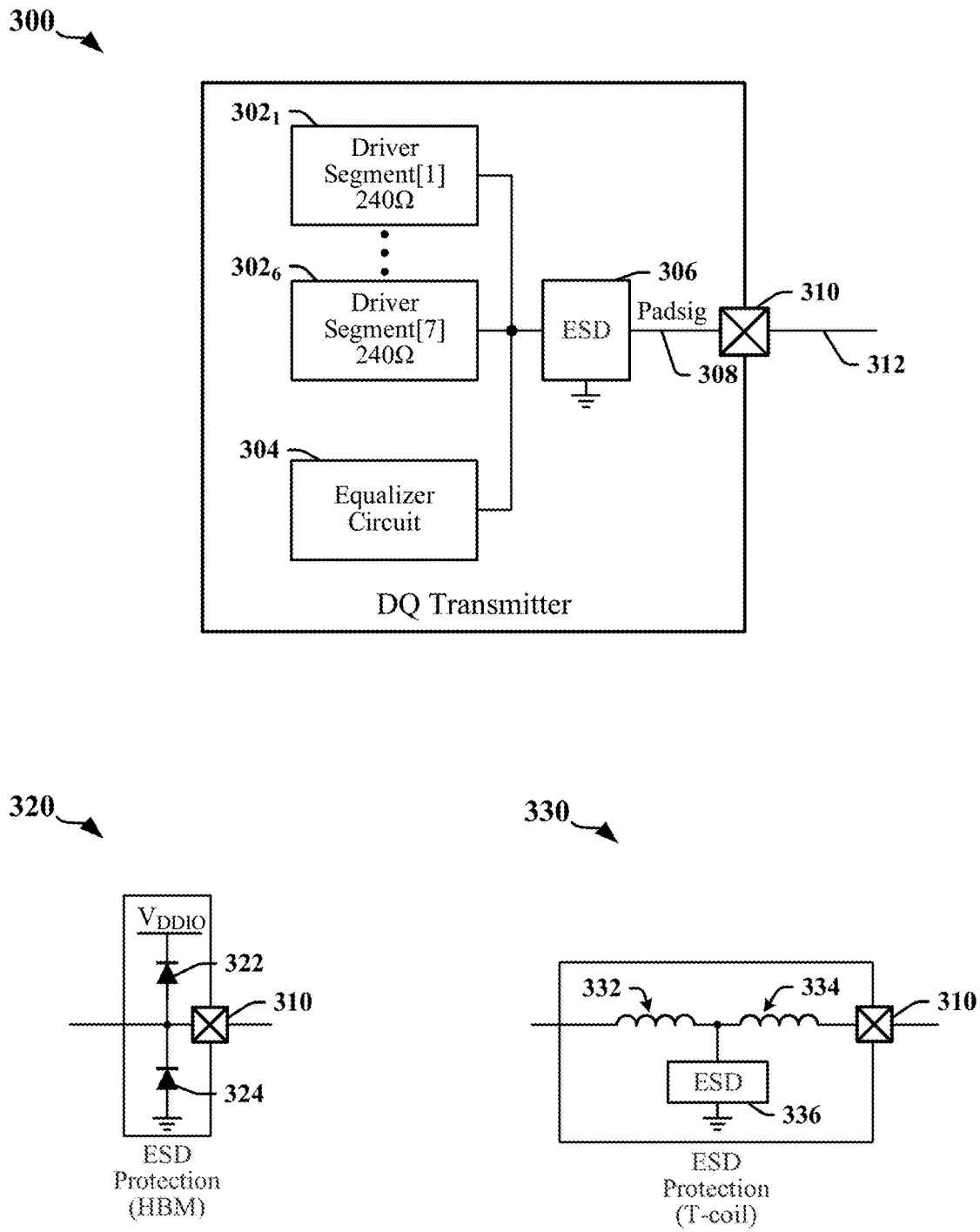
FIG. 3 illustrates certain features of an input/output circuit in a high-speed memory interface.

Certain features of a DDRIO circuit 300 are illustrated in FIG. 3. The DDRIO circuit 300 may be coupled to an I/O terminal 310. The I/O terminal 310 may be coupled to a line 312 of a high-speed parallel bus that interconnects a memory controller and one or more memory devices. An ESD protection circuit 306 may be coupled to the I/O terminal 310. For the purposes of this description, the I/O terminal 310 may correspond to a bonding pad in an IC device or SoC that facilitates bonding or contacting with a connecting wire or other interconnect.

The DDRIO circuit 300 includes multiple driver segments $302_1$-$302_6$ and an equalizer circuit 304. The number of driver segments $302_1$-$302_6$ provided in the DDRIO circuit 300 may be determined by the characteristics of the line 312 that is to be driven and the nature and value of termination at the transmitting and/or or receiving devices. In the example of LPDDR SDRAM, the line 312 may be unterminated when low-power, lower-frequencies are transmitted. Lower frequency signals may be transmitted at higher voltage levels than higher frequency signals. Higher frequency signaling in LPDDR SDRAM applications may use signaling transmitted at near-ground voltage levels and line terminations may be provided.

The number of driver segments $302_1$-$302_6$ used to drive the line 312 may be calculated to provide a desired current or voltage level on the line 312. The number and nature of the driver segments $302_1$-$302_6$ used to drive the line 312 may be selected to meet a specified or desired transition time of a signal (Padsig 308) to be transmitted over the line 312 through the I/O terminal 310. Certain LPDDR specifications require that DDRIO circuits support aggressive scaling of the voltage of ($V_{DDA}$) core power rails in order to support higher power optimization. The number and type of driver segments $302_1$-$302_6$ used to drive the line 312 may be dynamically selected based on mode of operation.

The multiple driver segments $302_1$-$302_6$ in the DDRIO circuit 300 may be configured to support different drive strengths and on-die DQ termination (ODT) requirements. In the illustrated example, each driver segment $302_1$-$302_6$ is calibrated to provide a pull-down impedance of 240 ohms. Pull-up may be calibrated to a nominal high output voltage ($V_{OH}$) target, which may be specified with reference to the output power rail voltage (VLDO). $V_{OH}$ represents the minimum required voltage swing for a defined mode of operation. In one example, $V_{OH}$=0.5*VLDO for terminated lines and $V_{OH}$=VLDO for unterminated lines.

The bandwidth of the DDRIO circuit 300 is limited by certain alternating current (AC) characteristics of the active driver segments $302_1$-$302_6$, the equalizer circuit 304, the ESD protection circuit 306 and the line 312 coupled to the I/O terminal 310, which can contribute to the I/O capacitance ($C_{IO}$) measured at the I/O terminal 310. $C_{IO}$ is typically a critical parameter and can limit AC performance at higher frequencies. The equalizer circuit 304 may be configured to offset certain effects of $C_{IO}$ and other parameters that may introduce distortion and non-linear response of the DDRIO circuit 300 and line 312. In some examples, the equalizer circuit 304 may be configured to provide or approximate pre-emphasis in order to mitigate for channel loss and linear inter-symbol interference (ISI). ISI can distort signals when a pulse or an edge transmitted in a time interval (i.e., a unit interval or UI) is affected by a pulse or an edge transmitted in a preceding UI due to non-linear frequency response of the line 312, for example. The equalizer circuit 304 may be provided to enable the DDRIO circuit 300 to operate at, or switch between standards-defined frequencies for LPDDR SDRAM of 6.4 GHz and 4.8 GHz, for example.

FIG. 3 includes an example of an ESD protection circuit 320. The ESD protection circuit 320 may be HBM-qualified or CDM-qualified. The ESD protection circuit 320 includes two diodes 322, 324 that are reverse biased unless a current surge causes a voltage at the I/O terminal 310 to exceed the nominal or rated voltage of the power supply provided to the DDRIO circuit 300. For the purposes of this description, the I/O terminal 310 may correspond to a bonding pad in an IC device or SoC that facilitates bonding or contacting with a connecting wire or other interconnect.

FIG. 3 includes a second example of an ESD protection circuit 330. The ESD protection circuit 330 is a T-coil that may include an ESD discharge circuit 336 that provides a discharge path to a power rail when a voltage applied to the I/O terminal 310 exceeds the nominal or rated voltage of the power supply. In one example, the one or more diodes (not shown) in the ESD discharge circuit 336 may be reverse biased unless an overvoltage condition occurs responsive to a current surge. The ESD discharge circuit 336 is coupled between two series-connected inductors 332, 334 that couple one or more driver circuits to the I/O terminal 310. For the purposes of this description, the I/O terminal 310 may correspond to a bonding pad in an IC device or SoC that facilitates bonding or contacting with a connecting wire or other interconnect.

Limiting power consumption presents a major challenge in communication interfaces, including communication interfaces that include SERDES circuits. In mobile communication devices, reducing power consumption can increase battery life between charges. Accordingly, power consumption is a parameter that must be considered when physical layer (PHY) circuits are designed for communication interfaces that are required to meet ever-increasing demands for data rates and corresponding signaling rates associated with the communication interface. Demands for higher data rates and increased performance from SERDES-based PHY circuits are a consequence of continual advances in process technology and changing industry and proprietary standards. Moreover, PHY circuits are typically required to maintain backward compatibility to all previous generations of technology while supporting the higher data rates required by ever-evolving standards, necessitating increased numbers of transistors. The switching frequency of PHY circuits in communication interfaces can be a major factor in power consumption of an apparatus. For example, the operating frequencies of clock generation circuits for SERDES-based PHY circuits are determinative of maximum data rates.

Increasing demands for data throughput has required SERDES physical layer circuits to accommodate bandwidths that double every 3 years or so. Specifications and protocols associated with SERDES tend to have a long legacy, and "backward compatibility" requirements necessitate support for multiple generations of interfaces, and requires SERDES physical layer circuits to handle a wide range of data rates. SERDES physical layer circuits typically support two or more modes of operation, including a high-performance mode and a low-power mode. High-performance mode may be implemented to support high data transmission rates with associated high levels of power consumption. Low-power mode may be implemented to reduce power consumption by transmitting data at lower data rates. Many applications require SERDES physical layer circuits to support both high-performance mode and low-power mode and to be able to switch between modes on command.

Figure 4:
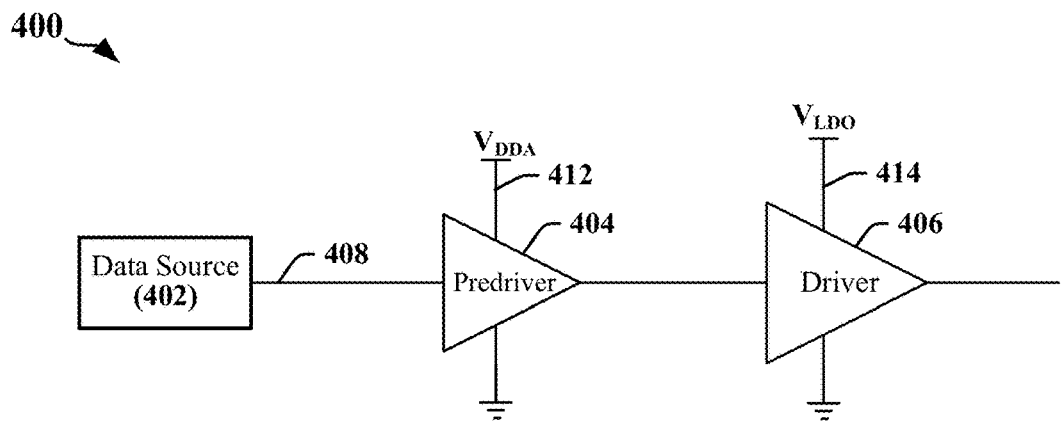
FIG. 4 illustrates certain aspects of a driver circuit that is configurable to function in different operating modes.
Figure 4:
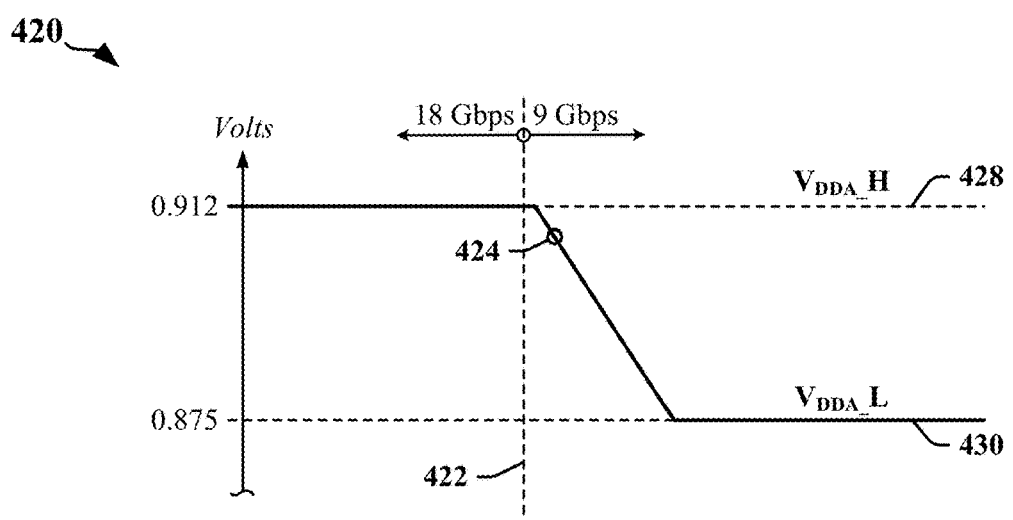

FIG. 4 illustrates certain aspects of a driver circuit 400 that is configurable to function in different operating modes. The driver circuit 400 is implemented in an integrated circuit and is illustrated in a high-level schematic form. The driver circuit 400 includes a predriver 404 and a line driver 406. The predriver 404 receives a data signal 408 from a data source 402 that is typically resident within the core of the integrated circuit. Accordingly, the predriver 404 is coupled to a core power rail 412 and receives power at a voltage level ($V_{DDA}$) used by core circuits. The predriver 404 may condition the data signal 408 in order to drive the line driver 406, which operates at the input/output (I/O) voltage level ($V_{LDO}$). The voltage level of $V_{LDO}$ may be configured based on the mode of operation enabled for the driver circuit 400.

The line driver 406a receives power from an I/O power rail 414 at $V_{LDO}$. For the purposes of this disclosure, the core voltage power supply rail in a memory device may be referred to as $V_{DDA}$ and the lowest voltage power supply rail is referred to as $V_{SSX}$. The graph 420 in FIG. 4 illustrates voltage ramping associated with a change in bus interface operating frequency. At a certain point in time 422, the data rate defined for the bus interface switches from 18 gigabits per second (Gbps) to 9 Gbps. A voltage ramp 424 is initiated to reduce $V_{DDA}$ from a first core voltage level 428 ($V_{DDA\_H}$) to a second core voltage level 430 ($V_{DDA\_L}$).

Certain challenges are associated with the design of SERDES physical layer circuits that can switch between both high-performance and low-power modes of operation. In conventional systems, reconfigurable driver circuits used to implement a transmitter data, clock or control lane are typically implemented using the same circuit design for high-performance mode and low-power mode paths. Multiple compromises are required in order to satisfy both high performance and low-power operation using the circuit architecture at every stage of a driver. One compromise involves the addition of certain circuits or features of circuits that are unneeded for lower data rate transmissions. Examples of features of circuits include transistor types, numbers of transistors in a stack of transistors used to handle higher voltage levels, and the number of stages required in an amplifying circuit. Typically, the same number of stages and the same device types are used for circuits that are used to support high-performance mode and circuits that are used to support low-power mode.

Another compromise involves the trade-off between power efficiency and performance that in essence requires a reduction in performance, and increase in power consumption or, in most cases, reductions in both performance and power efficiency. In some conventional systems, trade-offs are mitigated or avoided by providing completely separated high-performance mode and low-power mode paths. A high-performance path can be designed to maximize performance while a low-power path can be designed to maximize power efficiency. At any time, either the high-performance path or the low-power path is active. While separated paths can optimize both performance and power, the approach is costly since it increases number of I/O pins or solder bumps and the area of a semiconductor die that must be committed to the SERDES physical layer circuits. The optimizations provided by the separated paths approach can be undermined by generational changes specified for SERDES physical layer circuits.

Figure 5:
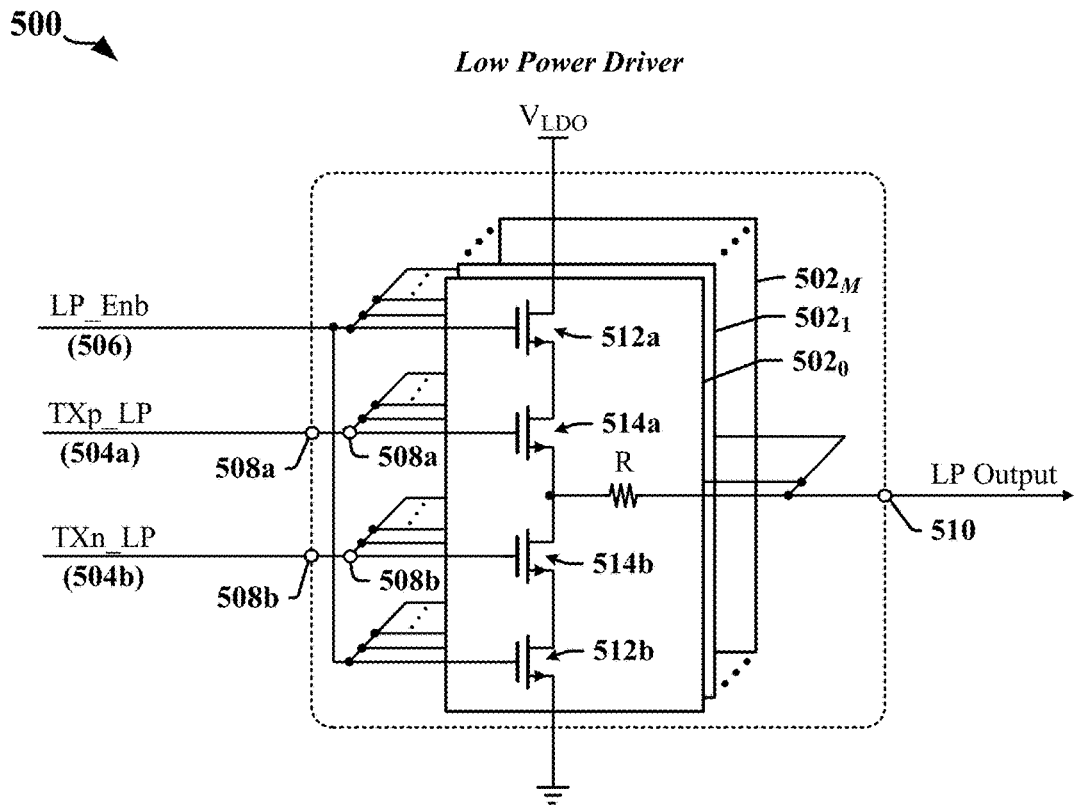
FIG. 5 illustrates examples of voltage mode driver circuits that may be implemented in a SERDES-based PHY interface.
Figure 5:
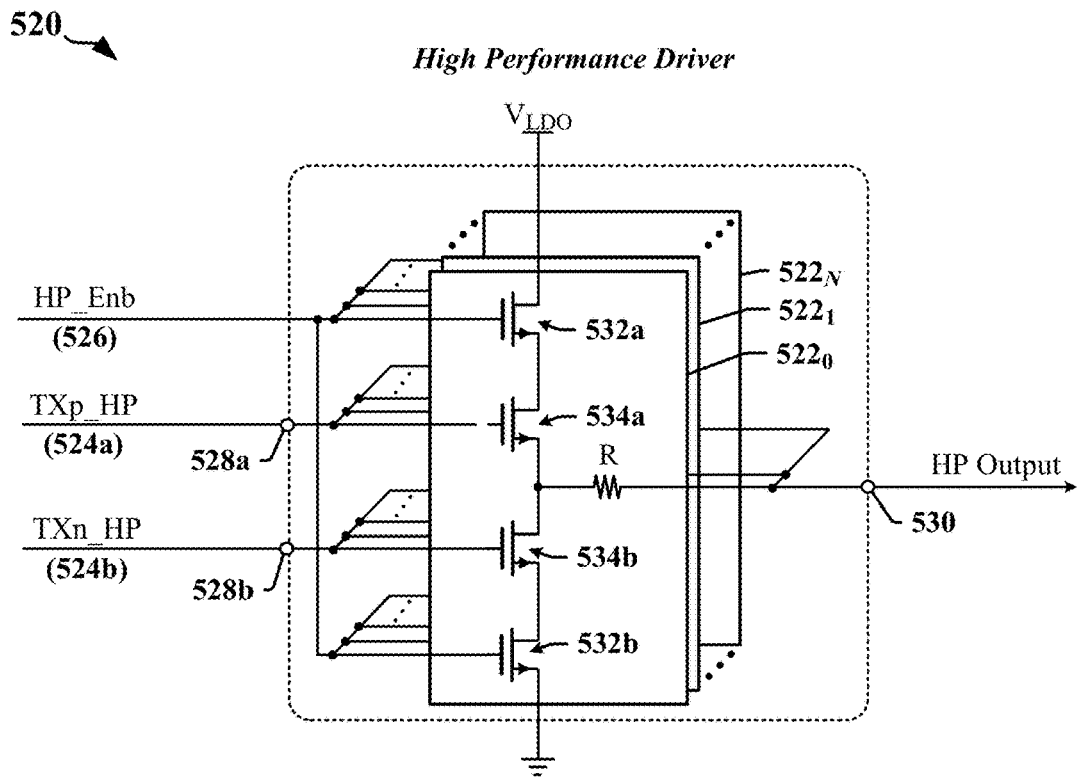

FIG. 5 illustrates a generalized example of a conventional approach to accommodating power and efficiency requirements in a SERDES-based PHY interface. In this example, two separate voltage mode driver circuits 500 and 520 are provided, where one of the voltage mode driver circuits 500, 520 is optimized for low-power operation and the other is optimized for high-performance operation. In this example, the PHY interface can minimize power consumption in low-power modes of operation without affecting maximum switching speed in high-performance modes of operation. There is a significant increase in the semiconductor real estate consumed by this type of PHY interface. In conventional implementations, real estate usage can be reduced where needed by using a single circuit to handle low-power and high-performance modes of operation, by accepting either a significant increase in power consumed in low-power modes of operation or a reduction in switching speed in high-performance modes of operation. The required tradeoff between power consumption and switching speed involve the number of driver segments provided in the driver, or the type, structure and configuration of transistors used to implement driver. For example, a driver optimized for high-performance modes of operation may include a higher number of driver segments and/or a higher number of transistors per driver segment than a driver optimized for low-power modes of operation.

The PHY interface in FIG. 5 includes a low-power (LP) voltage mode driver circuit 500. The LP voltage mode driver circuit 500 includes multiple segments or subcircuits, which are referred to herein as slices $502_0$-$502_M$. In the illustrated example, the slices $502_0$-$502_M$ receive a differential input signal through two nodes 508a and 508b and are configured to drive a LP output node 510 when enabled. Each of the slices $502_0$-$502_M$ includes a pullup section and a pulldown section. In the illustrated example, the pullup and pulldown sections are implemented using NMOS transistors 512a, 512b, 514a and 514b. In other examples, the pullup and pulldown sections may be implemented using PMOS transistors. In some examples, the pullup and pulldown sections may be implemented using some combination of NMOS and PMOS transistors.

In the illustrated example, the NMOS transistors 512a, 512b, 514a and 514b in the first slice $502_0$ are coupled in series between $V_{LDO}$ and ground. The pullup section in the first slice $502_0$ includes a first driver transistor 514a that has a gate controlled by an in-phase input signal 504a and a drain that is coupled to $V_{LDO}$ through a first gating transistor 512a. The first gating transistor 512a is turned on when an enable signal (i.e., the LP_Enb signal 506) coupled to the gate of the first gating transistor 512a is in an active state. In some instances, the LP_Enb signal 506 may be a multibit signal that determines which of the slices $502_0$-$502_M$ are activated or inactivated. When the first gating transistor 512a is turned on, the first driver transistor 514a responds to the in-phase input signal 504a and pulls the LP output node 510 toward $V_{LDO}$ through a resistance or impedance provided in the first slice $502_0$ when turned on. The pulldown section in the first slice $502_0$ includes a second driver transistor 514b that has a gate controlled by a quadrature input signal 504b and a source that is coupled to ground through a second gating transistor 512b. The quadrature input signal 504b is phase shifted by 180° with respect to the in-phase input signal 504a. The second gating transistor 512b is turned on when the LP_Enb signal 506 is in active state. The LP_Enb signal 506 is coupled to the gate of the second gating transistor 512b. When the second gating transistor 512b is turned on, the second driver transistor 514b responds to the quadrature input signal 504b and pulls the LP output node 510 toward ground through the resistance or impedance provided in the first slice $502_0$ when turned on.

Each of slices $502_1$-$502_M$ is similarly configured. Each of the slices $502_0$-$502_M$ may be selectively enabled or activated based on signaling state of the LP_Enb signal 506. In one example, the LP_Enb signal 506 configured to select a desired combination of the slices $502_0$-$502_M$ to enabled or activated.

The PHY interface in FIG. 5 further includes a high-performance (HP) voltage mode driver circuit 520. The HP voltage mode driver circuit 520 includes multiple circuits which may be characterized as subcircuits, segments and which are referred to herein as slices $522_0$-$522_N$. In the illustrated example, the slices $522_0$-$522_N$ receive a differential input signal through two nodes 528a and 528b and are configured to drive an HP output node 530 when enabled. Each of the slices $522_0$-$522_N$ includes a pullup section and a pulldown section. In the illustrated example, the pullup and pulldown sections are implemented using N-type metal-oxide-semiconductor (NMOS) transistors 532a, 532b, 534a and 534b. In other examples, the pullup and pulldown sections may be implemented using P-type metal-oxide-semiconductor (PMOS) transistors. In some examples, the pullup and pulldown sections may be implemented using some combination of NMOS and PMOS transistors.

In the illustrated example, the NMOS transistors 532a, 532b, 534a and 534b in the first slice $522_0$ are coupled in series between $V_{LDO}$ and ground. The pullup section in the first slice $522_0$ includes a first driver transistor 534a that has a gate controlled by an in-phase input signal 524a and a drain that is coupled to $V_{LDO}$ through a first gating transistor 532a. The first gating transistor 532a is turned on when an enable signal (i.e., the HP_Enb signal 526) coupled to the gate of the first gating transistor 532a is in an active state. When the first gating transistor 532a is turned on, the first driver transistor 534a responds to the in-phase input signal 524a and pulls the HP output node 530 toward $V_{LDO}$ through a resistance or impedance provided in the first slice $522_0$ when turned on. The pulldown section in the first slice $522_0$ includes a second driver transistor 534b that has a gate controlled by a quadrature input signal 524b and a source that is coupled to ground through a second gating transistor 532b. The quadrature input signal 524b is phase shifted by 180° with respect to the in-phase input signal 524a. The second gating transistor 532b is turned on when the HP_Enb signal 526, which is coupled to the gate of the second gating transistor 532b, is in active state. When the second gating transistor 532b is turned on, the second driver transistor 534b responds to the quadrature input signal 524b and pulls the HP output node 530 toward ground through the resistance or impedance provided in the first slice $522_0$ when turned on.

Each of slices $522_1$-$522_N$ is similarly configured. Each of the slices $522_0$-$522_N$ may be selectively enabled or activated based on signaling state of the HP_Enb signal 526. In one example, the HP_Enb signal 526 is configured to select a desired combination of the slices $522_0$-$522_M$ to enabled or activated.

In conventional systems, the low-power voltage mode driver circuit 500 and the high-performance voltage mode driver circuit 520 receive data signals 504a/604b and 524a/624b from different digital pathways. The digital pathways may include serializers and clock generation circuits configured for one of the modes of operation. The low-power voltage mode driver circuit 500 and the high-performance voltage mode driver circuit 520 and other analog circuits, including the ESD protection devices, may be configured based on certain characteristics of the communication channels to which they are coupled.

According to certain aspects of this disclosure, voltage mode drivers, ESD protection circuits, T-coil circuits, low dropout (LDO) voltage regulators and other analog front-end components can be shared for low-power and high-performance modes of operation. In conventional systems, these analog front-end components can occupy 60% or more of the semiconductor die area used to fabricate a transmission lane in a SERDES interface. These analog front-end components consume less than 30% of the power used by the SERDES interface. Other analog components may consume more than 50% of the power used by the SERDES interface, while occupying less than 30% of the semiconductor die. Analog front end components tend to be highly sensitive to electrical performance and may require substantial calibration or configuration. A voltage mode driver implemented in accordance with certain aspects of this disclosure can significantly reduce semiconductor die area and power consumption while reducing the complexity of the front end.

Figure 6:
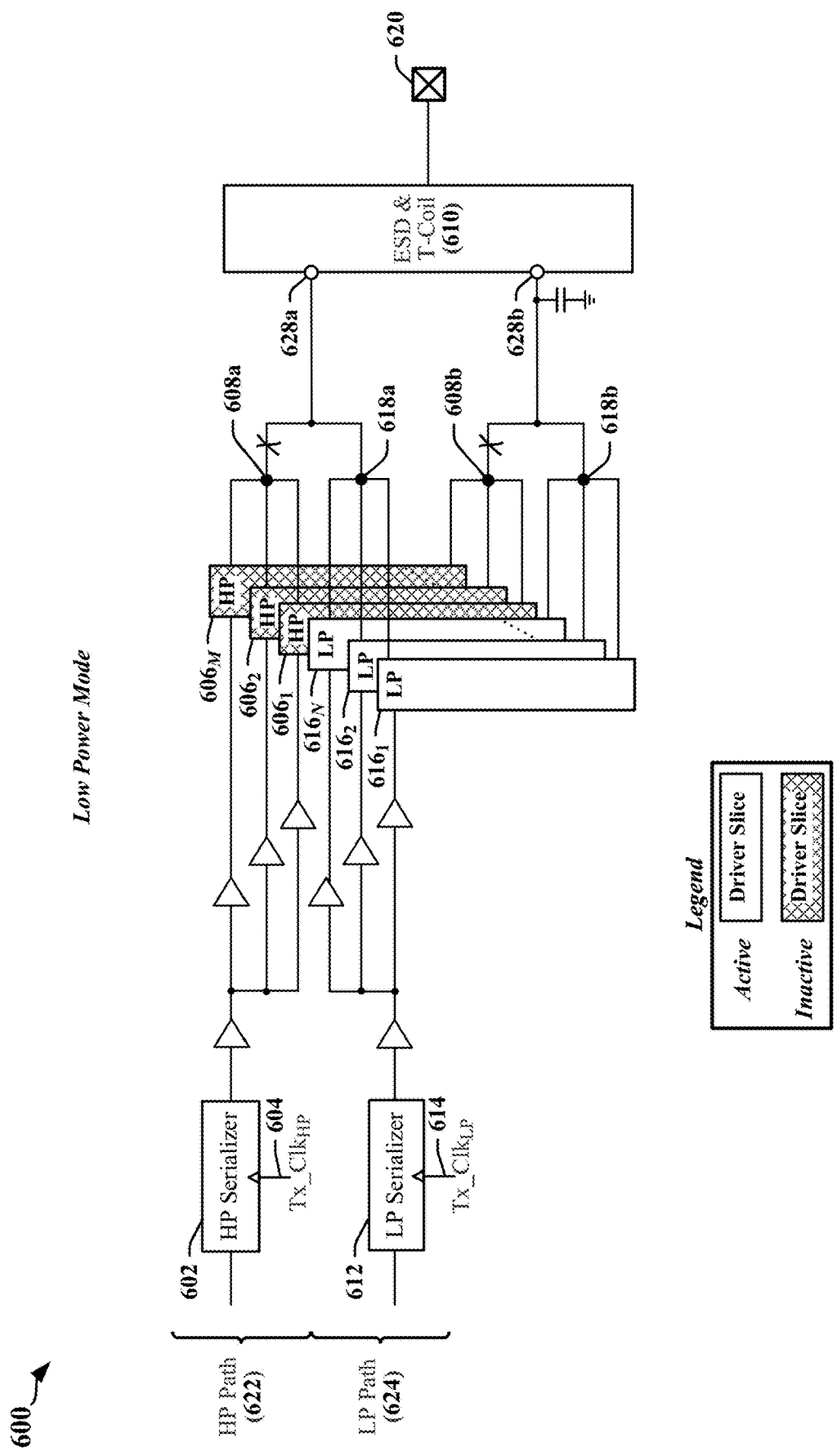
FIG. 6 illustrates a first example of a voltage mode driver circuit that is configured in accordance with certain aspects of this disclosure.

FIG. 6 illustrates a first example of a voltage mode driver circuit 600 that is configured in accordance with certain aspects of this disclosure. The voltage mode driver circuit 600 provides a high-performance signal path (the HP path 622) and a low-power signal path (the LP path 624), and can be operated in and low-power and high-performance modes of operation. FIG. 6 illustrates certain aspects of the voltage mode driver circuit 600 when it is operated in a low-power mode of operation. In the illustrated example, a T-Coil and ESD protection circuit 610 is shared by the HP path 722 and the LP path 724. The design and configuration of the T-Coil and ESD protection circuits 610 may be identical for both modes of operation. Other analog front-end components coupled to the voltage mode driver circuit 600 can also be shared. In one example, a low dropout (LDO) voltage regulator may be configured or optimized to control voltage swing and can support both the low-power and the high-performance modes of operation. The architecture and structure of the voltage mode driver circuit 600 is the same for both modes of operation. The voltage mode driver circuit 600 can be implemented with fewer pins or solder balls and can reduce semiconductor die area occupied by a SERDES-based PHY interface. Power consumption and dissipation can be reduced when the voltage mode driver circuit 600 is used.

The voltage mode driver circuit 600 includes multiple circuits which may be characterized as subcircuits, segments and which are referred to herein as slices $606_1$-$606_M$, $616_1$-$616_N$. The slices $606_1$-$606_M$, $616_1$-$616_N$ are shared between the HP path 622 or the LP path 624. In the illustrated voltage mode driver circuit 600, a first number (M) of HP slices $606_1$-$606_M$ are allocated to the HP path 622 a second number (N) LP slices $616_1$-$616_N$ are allocated to the LP path 624. A high-performance parallel-to-serial converter (the HP serializer 602) in the HP path 622 may be configured to provide a serial data stream to the HP slices $606_1$-$606_M$ in accordance with timing provided by a high-performance clock signal ($Tx\_Clk_{HP}$ 604). A low-power signal parallel-to-serial converter (the LP serializer 612) in the LP path 624 may be configured to provide a serial data stream to the LP slices $616_1$-$616_M$ in accordance with timing provided by a low-power clock signal ($Tx\_Clk_{LP}$ 604). In some implementations, a single parallel-to-serial converter may be configured to provide a serial data stream to both the HP path 622 and the LP path 624.

The outputs of the HP slices $606_1$-$606_M$ may be coupled together at common nodes 608a and 608b. The outputs of the LP slices $616_1$-$616_M$ may be coupled together at common nodes 618a and 618b. The common nodes 608a and 618a are coupled to a first input 628a of the T-Coil and ESD protection circuit 610 and the common nodes 608b and 618b are coupled to a second input 628b of the T-Coil and ESD protection circuit 610. An output of the T-Coil and ESD protection circuit 610 drives an output pad 620 of the voltage mode driver circuit 600.

The voltage mode driver circuit 600 in the illustrated example is configured for the low-power mode of operation. The HP slices $606_1$-$606_M$ are disabled in the low-power mode of operation. The outputs of the HP slices $606_1$-$606_M$ may be in a high-impedance state and/or do not source or sink any significant current flow through the common nodes 608a and 608b. The LP slices $616_1$-$616_N$ are enabled in the low-power mode of operation and drive the inputs 628a, 628b of the T-Coil and ESD protection circuit 610. In one implementation, some or all of the LP slices $616_1$-$616_N$ may be enabled during low-power mode of operation. In these implementations, the number of active LP slices $616_1$-$616_N$ may be selected based on application requirements. In one example, the number of active LP slices $616_1$-$616_N$ may be selected during calibration to provide a desired drive strength and/or to ensure that rise or fall times of edges in output signals are consistent with specified minimum and maximum values.

Figure 7:
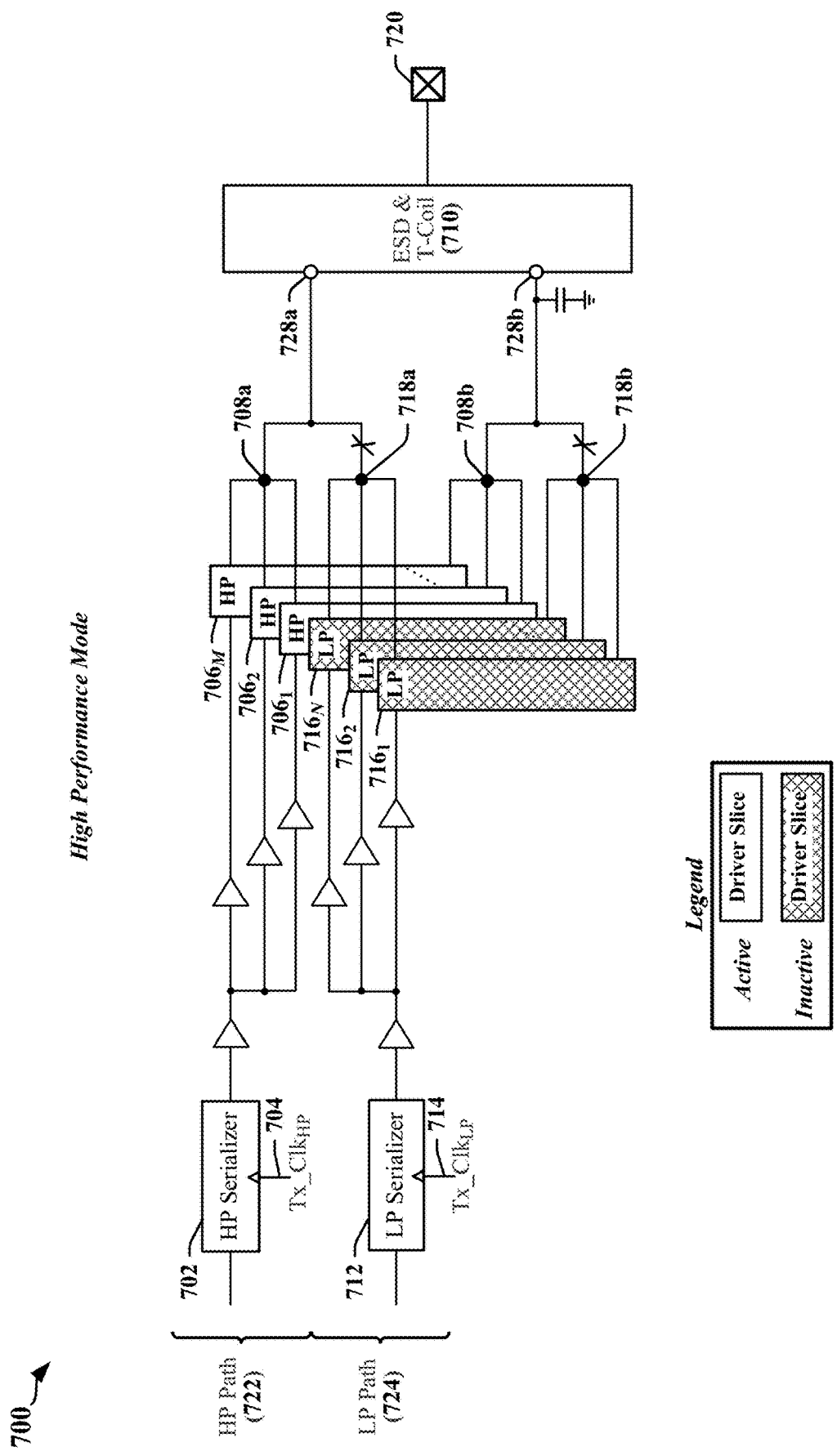
FIG. 7 illustrates a second example of a voltage mode driver circuit that is configured in accordance with certain aspects of this disclosure.

FIG. 7 illustrates a second example of a voltage mode driver circuit 700 that is configured in accordance with certain aspects of this disclosure. The voltage mode driver circuit 700 provides a high-performance signal path (the HP path 722) and a low-power signal path (the LP path 724), and can be operated in and low-power and high-performance modes of operation. FIG. 7 illustrates certain aspects of the voltage mode driver circuit 700 when it is operated in a high-performance mode of operation. In the illustrated example, a T-Coil and ESD protection circuit 710 is shared by the HP path 722 and the LP path 724. In The design and configuration of the T-Coil and ESD protection circuits 710 may be identical for both modes of operation. Other analog front-end components coupled to the voltage mode driver circuit 700 can also be shared. In one example, a low dropout (LDO) voltage regulator may be configured or optimized to control voltage swing and can support both the low-power and the high-performance modes of operation. The architecture and structure of the voltage mode driver circuit 700 is the same for both modes of operation. The voltage mode driver circuit 700 can be implemented with fewer pins or solder balls and can reduce semiconductor die area occupied by a SERDES-based PHY interface. Power consumption and dissipation can be reduced when the voltage mode driver circuit 700 is used.

The voltage mode driver circuit 700 includes multiple circuits which may be characterized as subcircuits, segments and which are referred to herein as slices $706_1$-$706_M$, $716_1$-$716_N$. The slices $706_1$-$706_M$, $716_1$-$716_N$ are shared between the HP path 722 or the LP path 724. In the illustrated voltage mode driver circuit 700, a first number (M) of HP slices $706_1$-$706_M$ are allocated to the HP path 722 a second number (N) LP slices $716_1$-$716_N$ are allocated to the LP path 724. A high-performance parallel-to-serial converter (the HP serializer 702) in the HP path 722 may be configured to provide a serial data stream to the HP slices $706_1$-$706_M$ in accordance with timing provided by a high-performance clock signal ($Tx\_Clk_{HP}$ 704). A low-power signal parallel-to-serial converter (the LP serializer 712) in the LP path 724 may be configured to provide a serial data stream to the LP slices $716_1$-$716_M$ in accordance with timing provided by a low-power clock signal ($Tx\_Clk_{LP}$ 704). In some implementations, a single parallel-to-serial converter may be configured to provide a serial data stream to both the HP path 722 and the LP path 724.

The outputs of the HP slices $706_1$-$706_M$ may be coupled together at common nodes 708a and 708b. The outputs of the LP slices $716_1$-$716_M$ may be coupled together at common nodes 718a and 718b. The common nodes 708a and 718a are coupled to a first input 728a of the T-Coil and ESD protection circuit 710 and the common nodes 708b and 718b are coupled to a second input 728b of the T-Coil and ESD protection circuit 710. An output of the T-Coil and ESD protection circuit 710 drives an output pad 720 of the voltage mode driver circuit 700.

The voltage mode driver circuit 700 in the illustrated example is configured for the high-performance mode of operation. The LP slices $716_1$-$716_N$ are disabled in the high-performance mode of operation. The outputs of the LP slices $716_1$-$716_N$ may be in a high-impedance state and/or do not source or sink any significant current flow through the common nodes 708a and 708b. The HP slices $706_1$-$706_M$ are enabled during low-power mode of operation and drive the inputs 728a, 728b of the T-Coil and ESD protection circuit 710. In one implementation, some or all of the LP slices $716_1$-$716_N$ may be enabled in the high-performance mode of operation. In these implementations, the number of active LP slices $716_1$-$716_N$ may be selected based on application requirements. In one example, the number of active LP slices $716_1$-$716_N$ may be selected during calibration to provide a desired drive strength and/or to ensure that rise or fall times of edges in output signals are consistent with specified minimum and maximum values.

Figure 8:
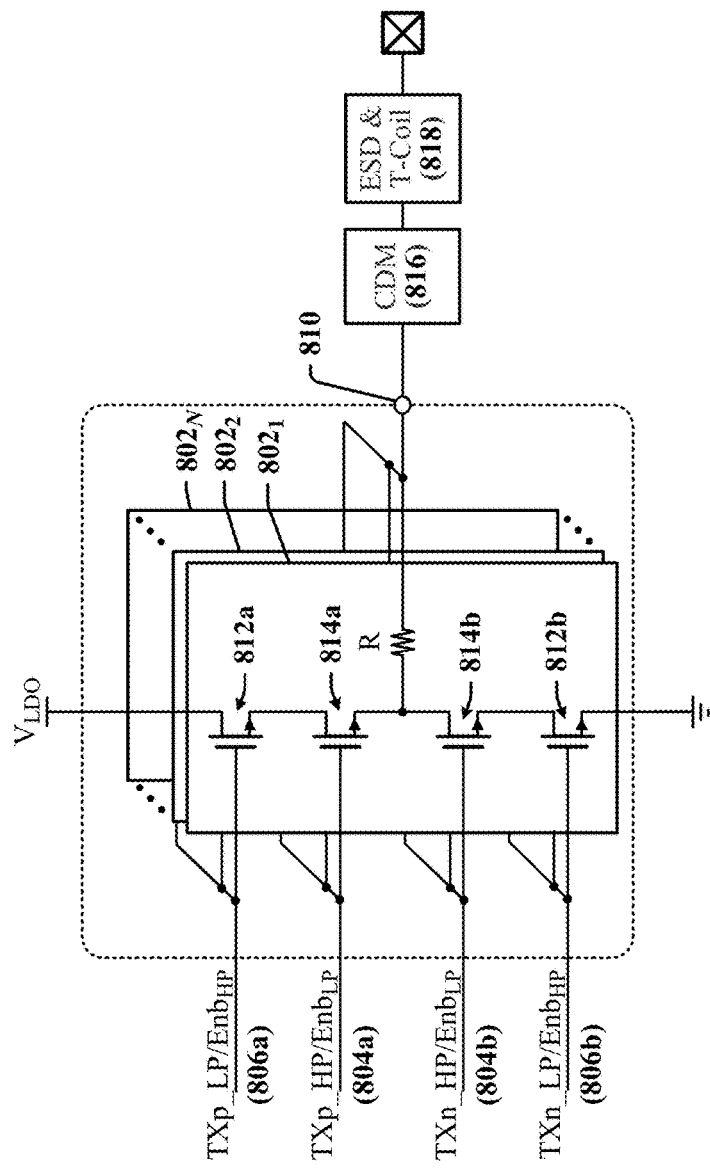
FIG. 8 illustrates a third example of a voltage mode driver circuit that is configured in accordance with certain aspects of this disclosure.

FIG. 8 illustrates a third example of a voltage mode driver circuit 800 that is configured in accordance with certain aspects of this disclosure. The voltage mode driver circuit 800 corresponds in some respects to the voltage mode driver circuits 600 and 700 illustrated in FIGS. 6 and 7 respectively. Certain aspects of the voltage mode driver circuit 800 related to controlling driver segments in low-power and high-performance modes of operation are illustrated. The illustrated voltage mode driver circuit 800 receives differential inputs, but it should be appreciated that the voltage mode driver circuit 800 can be configured to receive single ended signals.

The voltage mode driver circuit 800 can be shared in low-power and high-performance modes of operation. Analog front-end components coupled to the voltage mode driver circuit 800 can also be shared, fewer pins or solder balls may be required, and reductions in occupied semiconductor die area and power consumption can be obtained. The design and configuration of T-Coil and ESD protection circuits 816, 818 and the voltage mode driver circuit 800 is identical for both modes of operation. A shared LDO voltage regulator may be optimized for swing control for both modes of operation.

The voltage mode driver circuit 800 includes multiple circuits which may be characterized as subcircuits, segments and which are referred to herein as slices $802_1$-$802_N$. The voltage mode driver circuit 800 uses a first combination of the slices $802_1$-$802_N$ in the low-power mode of operation and a second combination of the slices $802_1$-$802_N$ in the high-performance mode of operation. The low-power and high-performance modes of operation are mutually exclusive, whereby low-power data and high-performance data are not simultaneously transmitted through the voltage mode driver circuit 800.

In the low-power mode of operation, high-performance data signals 804*a*, 804*b* may be used for control purposes. In one example, the high-performance data signals 804*a*, 804*b* serve as enable signals and may be driven in a static signaling state that disables the second combination of the slices in the low-power mode of operation.

In the high-performance mode of operation, low-power data signals 806*a*, 806*b* may be used for control purposes. In one example, the low-power data signals 806*a*, 806*b* serve as enable signals and may be driven in a static signaling state that disables the first combination of the slices in the high-performance mode of operation.

In the illustrated example, inputs of the slices $802_1$-$802_N$ are coupled in parallel to two differential input signals, of which one of the differential input signals is active at a given point in time while the other may serve as an enabling signal. Each of the slices $802_1$-$802_N$ is configured to configured to drive an output node 810 when enabled. Each of the slices $802_1$-$802_N$ includes a pullup section and a pulldown section. In the illustrated example, the pullup and pulldown sections are implemented using NMOS transistors 812*a*, 812*b*, 814*a* and 814*b*. In other examples, the pullup and pulldown sections may be implemented using PMOS transistors. In some examples, the pullup and pulldown sections may be implemented using some combination of NMOS and PMOS transistors.

In the illustrated example, the NMOS transistors 812*a*, 812*b*, 814*a* and 814*b* in the first slice $802_1$ are coupled in series between $V_{LDO}$ and ground. The pullup section in the first slice $802_1$ includes a first NMOS transistor 814*a* that has a gate controlled by an in-phase high-performance data signal 804*a* and a drain that is coupled to $V_{LDO}$ through a second NMOS transistor 812*a*. The gate of the second NMOS transistor 812*a* is controlled by an in-phase low-power data signal 806*a*. The pulldown section in the first slice $802_1$ includes a third NMOS transistor 814*b* that has a gate controlled by a quadrature high-performance data signal 804*b* and a source that is coupled to ground through a fourth NMOS transistor 812*b*. The high-performance data signal 804*b* is phase shifted by 180° with respect to the in-phase high-performance data signal 804*a*. The gate of the fourth NMOS transistor 812*b* is controlled by a quadrature low-power data signal 806*b*. The low-power data signal 806*b* is phase shifted by 180° with respect to the in-phase low-power data signal 806*a*.

In a high-performance mode of operation, the high-performance input signal carries encoded data and the first NMOS transistor 814*a* switches on and off in response to the in-phase high-performance data signal 804*a* and the third NMOS transistor 814*b* switches off and on in response to the quadrature high-performance data signal 804*b*. The low-power input signal is inactive and both the in-phase low-power data signal 806*a* and the quadrature low-power data signal 806*b* may be pulled to a signaling state that causes the second NMOS transistor 812*a* and the fourth NMOS transistors 812*b* to be turned on. In some implementations gating logic on each slice $802_1$-$802_N$ responds to an enable signal such that a desired number of slices $802_1$-$802_N$ are activated in the high-performance mode of operation. The enable signal provided to each slice may be provided in a multibit enable signal that determines which of the slices $802_1$-$802_N$ are activated or inactivated.

In a low-power mode of operation, the low-power input signal carries encoded data and the second NMOS transistor 812*a* switches on and off in response to the in-phase low-power data signal 806*a* and the fourth NMOS transistor 812*b* switches off and on in response to the quadrature low-power data signal 806*b*. The high-performance input signal is inactive and both the in-phase high-performance data signal 804*a* and the quadrature high-performance data signal 804*b* may be pulled to a signaling state that causes the second and fourth NMOS transistors 812*a* and 812*b* to be turned on.

In some implementations gating logic on each slice $802_1$-$802_N$ responds to an enable signal such that a desired number of slices $802_1$-$802_N$ are activated in the low-power mode of operation. The enable signal provided to each slice may be provided in a multibit enable signal that determines which of the slices $802_1$-$802_N$ are activated or inactivated.

Each of slices $802_1$-$802_N$ is enabled or disabled by the idled data path. In one example, the LP data path is the idled data path in HP mode. In another example, the HP data path is the idled data path in LP mode. Each of the slices $802_1$-$802_N$ may be selectively enabled or activated based on signaling state of a corresponding enable signal in the n-bit enable signal.

In one aspect of the disclosure, the voltage mode driver circuit 800 is configured to operate as a multiplexer that selects between high-performance and low-power signal paths signals. The high-speed signal path may be selected in a first mode of operation. In the high-speed mode of operation, the in-phase low-power data signal 806*a* and the quadrature low-power data signal 806*b* may be driven to a first signaling state that causes the transistors 812*a* and 812*b* to be turned on. In the high-speed mode of operation, the output of the first slice $802_1$ is controlled by the in-phase high-performance data signal 804*a* and the quadrature high-performance data signal 804*b*. The low-power signal path may be selected in a low-power mode of operation. In the low-power mode of operation, the in-phase high-performance data signal 804*a* and the quadrature high-performance data signal 804*b* may be driven to the first signaling state that causes the transistors 814*a* and 814*b* to be turned on. In the low-power mode of operation, the output of the first slice $802_1$ is controlled by the in-phase low-power data signal 806*a* and the quadrature low-power data signal 806*b*. A third mode of operation may be defined in which the in-phase high-performance data signal 804*a*, quadrature high-performance data signal 804*b*, in-phase low-power data signal 806*a* and quadrature low-power data signal 806*b* are driven to a second signaling state that causes the transistors 812*a*, 812*b*, 814*a* and 814*b* are turned off. In the third mode of operation, the output of the first slice $802_1$ is in an inactive or high impedance state. In the illustrated example, the first signaling state may be at or near $V_{LDO}$ and the second signaling state may be at or near ground.

Additional control signals may be provided to configure the drive strength, impedance or another characteristic of the voltage mode driver circuit 800 in each mode of operation. In certain implementations, the voltage mode driver circuit 800 may be configured to provide a differential output signal.

In some implementations, each of the slices $802_1$-$802_N$ or combinations of the slices $802_1$-$802_N$ may be coupled independently to the high-performance data signals 804*a*, 804*b* and/or the low-power data signals 806a, 806b. In one example, the gate of the transistor corresponding to the NMOS transistors 812a in the first slice 802$_1$ is coupled to low-power data signal 806a through a path that is independent and separate from the paths through which the other slices 802$_2$-802$_N$ are coupled to low-power data signal 806a. In the latter example, the configuration of paths provided for low-power data signal 806a enables each of the slices 802$_1$-802$_N$ to be selectively activated or deactivated in high-performance modes of operation, when NMOS transistors 812a is used for control/enabling purposes.

Figure 9:
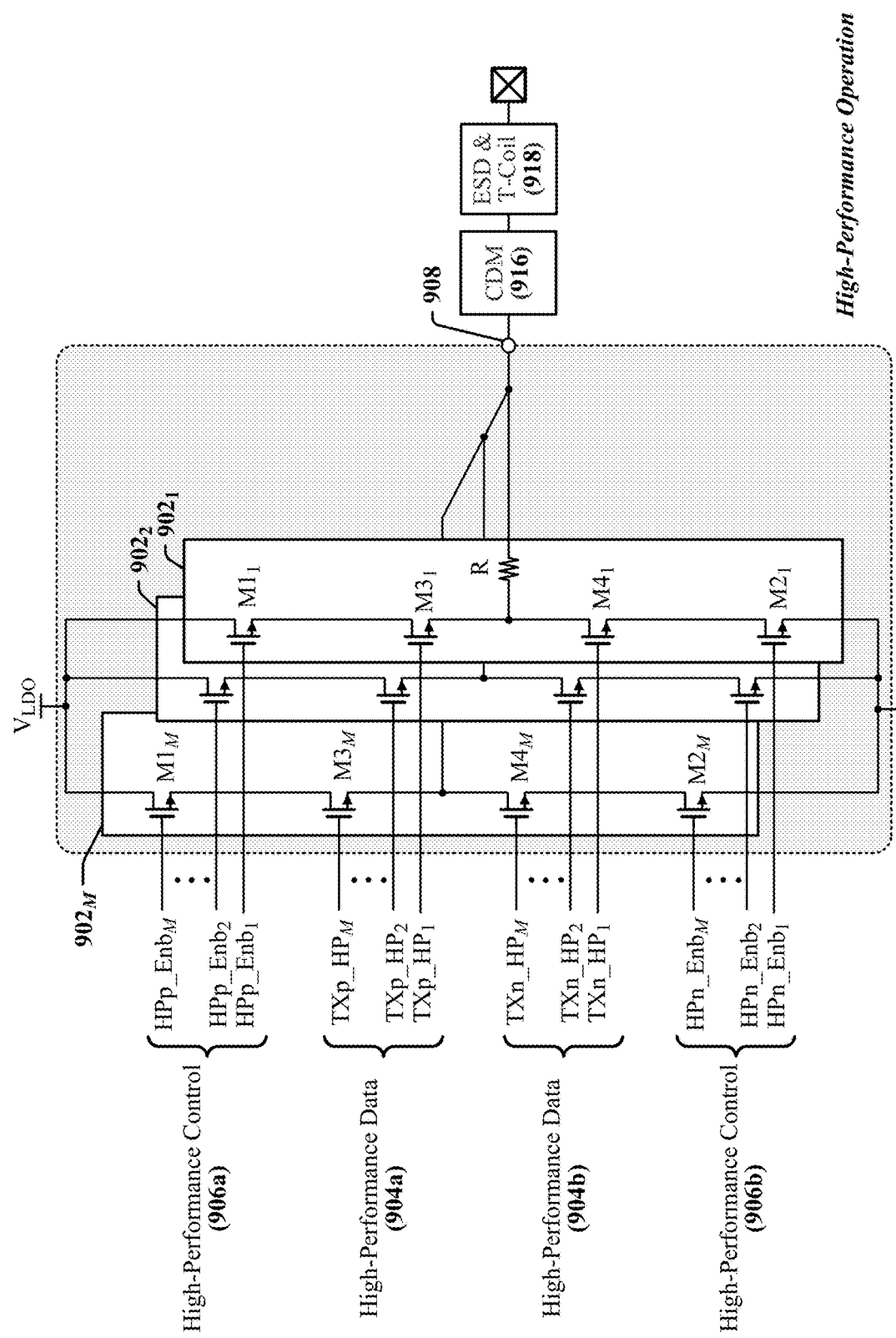
FIG. 9 illustrates a fourth example of a voltage mode driver circuit that is configured in accordance with certain aspects of this disclosure.

FIG. 9 illustrates a fourth example of a voltage mode driver circuit 900 that is configured in accordance with certain aspects of this disclosure. In this example, of the slices 902$_1$-902$_M$ provided in the voltage mode driver circuit 900 may be coupled independently to high-performance and low-power data signals. The voltage mode driver circuit 900 corresponds in some respects to the voltage mode driver circuit 800 illustrated in FIG. 8. Certain aspects of the voltage mode driver circuit 900 related to controlling driver segments in high-performance modes of operation are illustrated. The illustrated voltage mode driver circuit 900 receives differential inputs, but it should be appreciated that the voltage mode driver circuit 900 can be configured to receive single ended signals.

Figure 10:
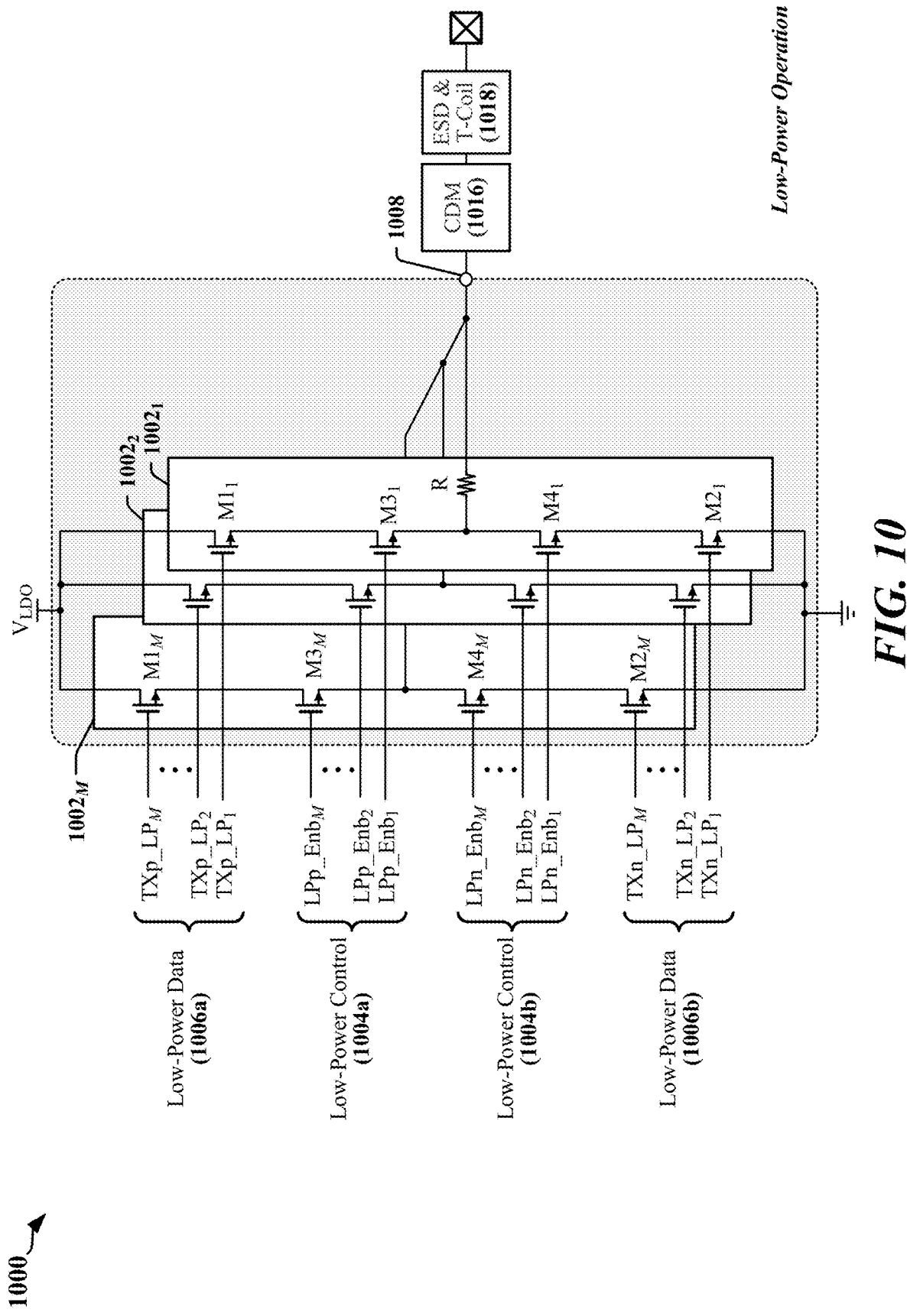
FIG. 10 illustrates a fifth example of a voltage mode driver circuit that is configured in accordance with certain aspects of this disclosure.

The illustrated voltage mode driver circuit 900 is configured for use in a high-performance mode of operation. The voltage mode driver circuit 900 can be configured for use in low-power and high-performance modes of operation. An example in which the voltage mode driver circuit 900 can be reconfigured for use in a low-power mode of operation is illustrated in FIG. 10. Analog front-end components 916, 918 coupled to the voltage mode driver circuit 900 can be shared. In some instances, fewer pins or solder balls may be required. In some instances, reductions in occupied semiconductor die area and power consumption can be obtained.

The voltage mode driver circuit 900 includes multiple circuits which may be characterized as subcircuits, segments and which are referred to herein as slices 902$_1$-902$_M$. The voltage mode driver circuit 900 can be configured to use some or all of the slices 902$_1$-902$_M$ in the high-performance mode of operation and may use a different number of the slices 902$_1$-902$_M$ when operating in a low-power mode. In high-performance modes of operation, high-performance data signals 904a, 904b are provided to the voltage mode driver circuit 900 and high-performance control signals 906a, 906b are provided through the low-power data pathways. In the illustrated example, the high-performance control signals 906a, 906b may be driven in a static signaling state. The high-performance control signals 906a, 906b selectively activate the slices 902$_1$-902$_M$ to be used during a high-performance modes of operation. The number or combination of slices 902$_1$-902$_M$ to be activated may be determined by a designer, during system configuration and/or following calibration.

In the illustrated example, inputs of each of the slices 902$_1$-902$_M$ are coupled to corresponding signals in the high-performance data signals 904a, 904b. Each of the slices 902$_1$-902$_M$ is configured to configured to drive an output node 908 when enabled. Each of the slices 902$_1$-902$_M$ includes a pullup section and a pulldown section. In the illustrated example, the pullup and pulldown sections are implemented using NMOS transistors. In other examples, the pullup and pulldown sections may be implemented using PMOS transistors. In some examples, the pullup and pulldown sections may be implemented using some combination of NMOS and PMOS transistors.

FIG. 10 illustrates a fifth example of a voltage mode driver circuit 1000 that is configured in accordance with certain aspects of this disclosure. In this example, of the slices 1002$_1$-1002$_M$ provided in the voltage mode driver circuit 1000 may be coupled independently to high-performance and low-power data signals. The voltage mode driver circuit 1000 corresponds in some respects to the voltage mode driver circuit 800 illustrated in FIG. 8. Certain aspects of the voltage mode driver circuit 1000 related to controlling driver segments in low-power modes of operation are illustrated. The illustrated voltage mode driver circuit 1000 receives differential inputs, but it should be appreciated that the voltage mode driver circuit 1000 can be configured to receive single ended signals. The voltage mode driver circuit 1000 can be shared in low-power and high-performance modes of operation. A high-performance mode of operation is illustrated in FIG. 10.

The illustrated voltage mode driver circuit 1000 is configured for use in a low-power mode of operation. The voltage mode driver circuit 1000 can be configured for use in low-power and high-performance modes of operation. An example in which the voltage mode driver circuit 1000 can be reconfigured for use in a high-performance mode of operation is illustrated in FIG. 9. Analog front-end components 1016, 1018 coupled to the voltage mode driver circuit 1000 can be shared. In some instances, fewer pins or solder balls may be required. In some instances, reductions in occupied semiconductor die area and power consumption can be obtained.

The voltage mode driver circuit 1000 includes multiple circuits which may be characterized as subcircuits, segments and which are referred to herein as slices 1002$_1$-1002$_M$. The voltage mode driver circuit 1000 can be configured to use some or all of the slices 1002$_1$-1002$_M$ in the low-power mode of operation and may use a different number of the slices 1002$_1$-1002$_M$ when operating in a high-performance mode. In low-power modes of operation, low-power data signals 1006a, 1006b are provided to the voltage mode driver circuit 1000 and low-power control signals 1004a, 1004b are provided through the high-performance data pathways. In the illustrated example, the low-power control signals 1004a, 1004b may be driven in a static signaling state. The low-power control signals 1004a, 1004b selectively activate the slices 1002$_1$-100$_M$ to be used during a low-power modes of operation. The number or combination of slices 1002$_1$-1002$_M$ to be activated may be determined by a designer, during system configuration and/or following calibration.

In the illustrated example, inputs of each of the slices 1002$_1$-1002$_M$ are coupled to corresponding signals in the low-power data signals 1006a, 1006b. Each of the slices 1002$_1$-1002$_M$ is configured to configured to drive an output node 1008 when enabled. Each of the slices 1002$_1$-1002$_M$ includes a pullup section and a pulldown section. In the illustrated example, the pullup and pulldown sections are implemented using NMOS transistors. In other examples, the pullup and pulldown sections may be implemented using PMOS transistors. In some examples, the pullup and pulldown sections may be implemented using some combination of NMOS and PMOS transistors.

With reference also to FIG. 9, each of the slices 902$_1$-902$_M$, 1002$_1$-1002$_M$ is coupled to a dedicated, separated data path. In some implementations, a data path coupled to an inactive slice 902$_1$-902$_M$, 1002$_1$-1002$_M$ can be idled or held in a static signaling state, in order to conserve power for example. In some implementations, certain of the slices 902$_1$-902$_M$, 1002$_1$-1002$_M$ may be reserved for use in a high-performance mode of operation or for a low-power mode of operation. In one example, a slice $902_1$-$902_M$, $1002_1$-$1002_M$ reserved for one mode of operation may be surplus to requirements for the other mode of operation. In another example, a slice $902_1$-$902_M$, $1002_1$-$1002_M$ reserved for one mode of operation may have a different circuit configuration than other slices $902_1$-$902_M$, $1002_1$-$1002_M$.

In the voltage mode driver circuits 900, 1000 illustrated in FIGS. 9 and 10, high-performance data signals 904a, 904b are coupled to transistors at the center of the transistor stack (i.e., transistors $M1_x$, $M2_x$, $M3_x$ and $M4_x$, where $1 \leq x \leq M$), and low-power data signals 1006a, 1006b are coupled to transistors at the edges of the transistor stack. Other configurations of data paths and transistors can be implemented.

Figure 11:
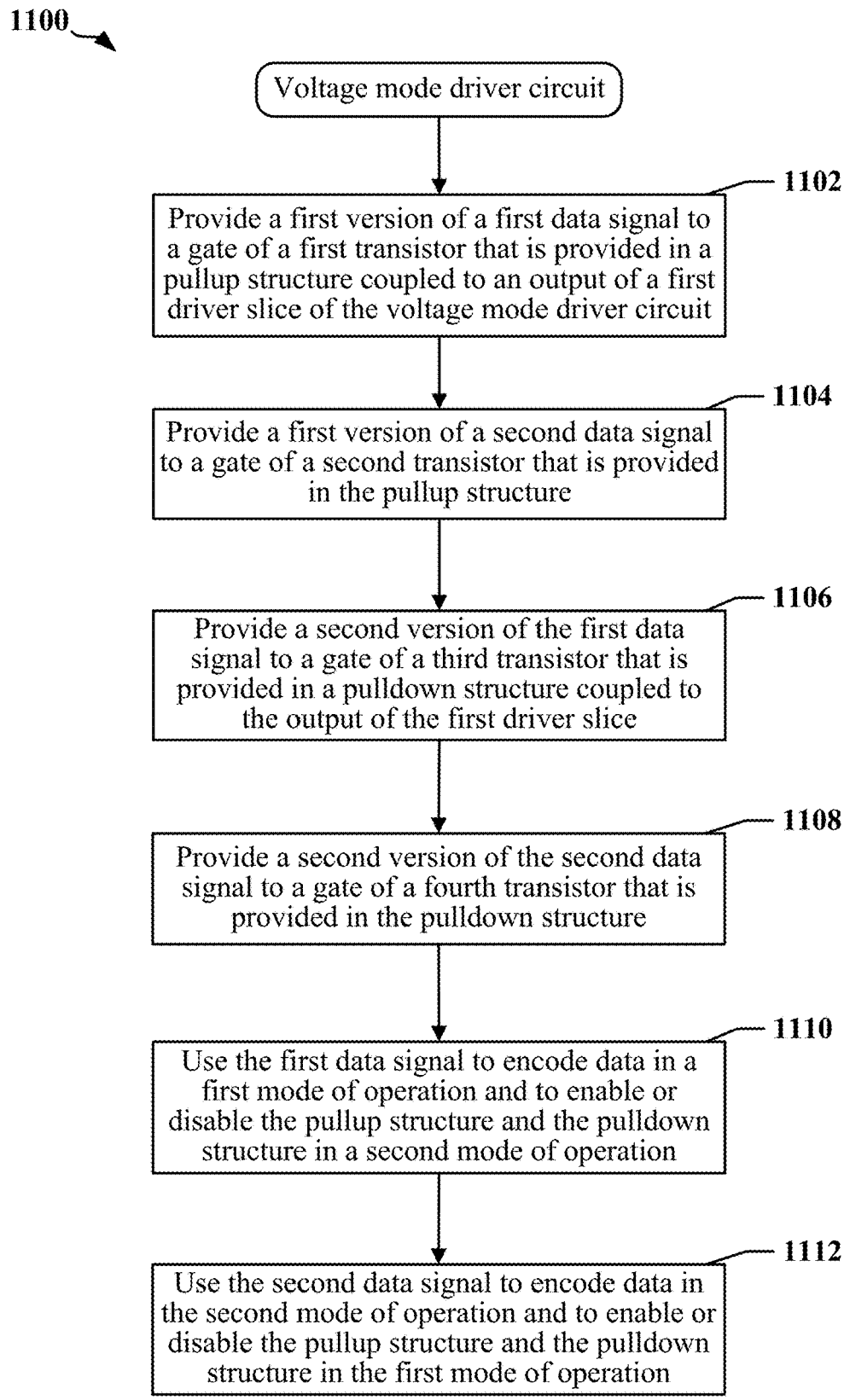
FIG. 11 is a flowchart illustrating an example of a method for operating a voltage mode driver circuit in accordance with certain aspects of this disclosure.

FIG. 11 is a flowchart 1100 illustrating an example of a method for operating a voltage mode driver circuit in accordance with certain aspects of this disclosure. The method may be implemented by a controller in a physical layer interface that is coupled to a data communication link.

At block 1102, a first version of a first data signal is provided to a gate of a first transistor that is provided in a pullup structure coupled to an output of a first driver slice of the voltage mode driver circuit. At block 1104, a first version of a second data signal is provided to a gate of a second transistor that is provided in the pullup structure. At block 1106, a second version of the first data signal is provided to a gate of a third transistor that is provided in a pulldown structure coupled to the output of the first driver slice. At block 1108, a second version of the second data signal is provided to a gate of a fourth transistor that is provided in the pulldown structure. At block 1110, the first data signal is used to encode data in a first mode of operation and to enable or disable the pullup structure and the pulldown structure in a second mode of operation. At block 1112, the second data signal is used to encode data in the second mode of operation and to enable or disable the pullup structure and the pulldown structure in the first mode of operation.

In some implementations, a second driver slice of the voltage mode driver circuit includes a pullup structure responsive to an in-phase version of the first data signal and an in-phase version of the second data signal, and a pulldown structure responsive to a quadrature version of the first data signal and a quadrature version of the second data signal. An output of the second driver slice may be coupled to the output of the first driver slice. An electrostatic discharge protection circuit may be coupled to the output of the first driver slice.

In some implementations, a first serializer may be used to provide the first data signal based on timing provided by a first clock signal generated by a first clock generator. A second serializer may be used to provide the second data signal based on timing provided by a second clock signal generated by a second clock generator.

In some implementations, the first data signal is gated by an enable signal during the second mode of operation. The second data signal may be gated by the enable signal during the first mode of operation. The enable signal may be configured to indicate whether the pullup structure and the pulldown structure are to be disabled in a current mode of operation.

In some implementations, data is transmitted by the voltage mode driver circuit at a higher data rate in the first mode than in the second mode of operation. In one example, data is transmitted by the voltage mode driver circuit at 18 gigabits per second in the first mode of operation and at 9 gigabits per second in the second mode of operation.

The operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module (s), including, but not limited to a circuit, an application-specific integrated circuit (ASIC), or processor. Generally, where there are operations illustrated in figures, those operations may have corresponding counterpart means-plus-function components with similar numbering.

In one example aspects, an apparatus includes means for providing a high-speed signaling path through a voltage mode driver and means for providing a low-power signaling path through the voltage mode driver. The means for providing the high-speed signaling path may include a first pair of transistors that is configured to receive a high-speed differential data signal. The means for providing the low-power signaling path may include a second pair of transistors that is configured to receive a low-power differential data signal. The first pair of transistors and the second pair of transistors may be coupled in series between rails of a power supply. The high-speed differential data signal may encode data in a first mode of operation and may enable a first driver slice of the voltage mode driver in a second mode of operation. The low-power differential data signal may encode data in the second mode of operation and may enable the first driver slice of the voltage mode driver in the first mode of operation.

In some instances, the means for providing a high-speed signaling path through the voltage mode driver further includes a third pair of transistors that is configured to receive a gated version of the high-speed differential data signal and the means for providing the low-power signaling path through the voltage mode driver further includes a fourth pair of transistors that is configured to receive a gated version of the low-power differential data signal. The third pair of transistors and the fourth pair of transistors may be coupled in series. The third pair of transistors and the fourth pair of transistors may be coupled in parallel with the first pair of transistors and the second pair of transistors. The gated version of the high-speed differential data signal may enable a second driver slice of the voltage mode driver in the second mode of operation. The gated version of the low-power differential data signal may enable the second driver slice of the voltage mode driver in the first mode of operation. In some implementations, the high-speed differential data signal or the low-power differential data signal disables the first driver slice of the voltage mode driver in a third mode of operation.

In some implementations, an ESD protection circuit is coupled to the output of the first driver slice. In some examples, the voltage mode driver is coupled to a first serializer configured to encode data in the high-speed differential data signal. In some examples, the voltage mode driver is coupled to a second serializing circuit configured to encode data in the low-power differential data signal. In some examples, the voltage mode driver is coupled to a serializer that is configured to encode data in the high-speed differential data signal and in the low-power differential data signal.

A voltage mode driver circuit configured in accordance with certain aspects of this disclosure has a first driver slice that includes a first transistor that is provided in a pullup structure that is coupled to an output of the first driver slice. The first transistor may have a gate configured to receive a first version of a first data signal. The first driver slice may include a second transistor that is provided in the pullup structure. The second transistor may have a gate configured to receive a first version of a second data signal. The first driver slice may include a third transistor in a pulldown structure that is coupled to the output of the first driver slice. The third transistor may have a gate configured to receive a second version of the first data signal that is a complement of the first version of the first data signal, The first driver slice may include a fourth transistor that is provided in the pulldown structure. The fourth transistor may have a gate configured to receive a second version of the second data signal that is a complement of the first version of the second data signal. The first data signal may encode data in a first mode of operation and may enable or disable the pullup structure and the pulldown structure in a second mode of operation. The second data signal may encode data in the second mode of operation and may enable or disable the pullup structure and the pulldown structure in the first mode of operation.

In certain implementations, the voltage mode driver circuit has a second driver slice that includes a pullup structure responsive to an in-phase version of the first data signal and an in-phase version of the second data signal, and a pulldown structure responsive to a quadrature version of the first data signal and a quadrature version of the second data signal. An output of the second driver slice may be coupled to the output of the first driver slice.

In certain implementations, the voltage mode driver circuit has an ESD protection circuit coupled to the output of the first driver slice. In certain implementations, the voltage mode driver circuit includes a first serializer configured to provide the first data signal based on timing provided by a first clock signal generated by a first clock generator, and a second serializer configured to provide the second data signal based on timing provided by a second clock signal generated by a second clock generator.

In certain implementations, the first data signal is gated by an enable signal during the second mode of operation. The second data signal may be gated by the enable signal during the first mode of operation. The enable signal may determine whether the pullup structure and the pulldown structure are to be disabled in a current mode of operation.

In certain implementations, data is transmitted by the voltage mode driver circuit at a higher data rate in the first mode than in the second mode of operation. In one example, data is transmitted by the voltage mode driver circuit at 18 gigabits per second in the first mode of operation and at 9 gigabits per second in the second mode of operation.

Some implementation examples are described in the following numbered clauses:

1. A voltage mode driver circuit comprising a first driver slice that includes: a first transistor, provided in a pullup structure that is coupled to an output of the first driver slice, the first transistor having a gate configured to receive a first version of a first data signal; a second transistor, provided in the pullup structure, the second transistor having a gate configured to receive a first version of a second data signal; a third transistor, provided in a pulldown structure that is coupled to the output of the first driver slice, the third transistor having a gate configured to receive a second version of the first data signal that is a complement of the first version of the first data signal; and a fourth transistor, provided in the pulldown structure, the fourth transistor having a gate configured to receive a second version of the second data signal that is a complement of the first version of the second data signal, wherein the first data signal encodes data in a first mode of operation and enables or disables the pullup structure and the pulldown structure in a second mode of operation, and wherein the second data signal encodes data in the second mode of operation and enables or disables the pullup structure and the pulldown structure in the first mode of operation.

2. The voltage mode driver circuit as described in clause 1, further comprising: a second driver slice that includes a pullup structure responsive to an in-phase version of the first data signal and an in-phase version of the second data signal, and a pulldown structure responsive to a quadrature version of the first data signal and a quadrature version of the second data signal, wherein an output of the second driver slice is coupled to the output of the first driver slice.

3. The voltage mode driver circuit as described in clause 1 or clause 2, further comprising: an electrostatic discharge protection circuit coupled to the output of the first driver slice.

4. The voltage mode driver circuit as described in any of clauses 1-3, further comprising: a first serializer configured to provide the first data signal based on timing provided by a first clock signal generated by a first clock generator; and a second serializer configured to provide the second data signal based on timing provided by a second clock signal generated by a second clock generator.

5. The voltage mode driver circuit as described in any of clauses 1-4, wherein the first data signal is gated by an enable signal during the second mode of operation, wherein the second data signal is gated by the enable signal during the first mode of operation, and wherein the enable signal determines whether the pullup structure and the pulldown structure are to be disabled in a current mode of operation.

6. The voltage mode driver circuit as described in any of clauses 1-5, wherein data is transmitted by the voltage mode driver circuit at a higher data rate in the first mode than in the second mode of operation.

7. The reconfigurable driver as described in clause 6, wherein data is transmitted by the voltage mode driver circuit at 18 gigabits per second in the first mode of operation and at 9 gigabits per second in the second mode of operation.

8. An apparatus comprising: means for providing a high-speed signaling path through a voltage mode driver, including a first pair of transistors that is configured to receive a high-speed differential data signal; and means for providing a low-power signaling path through the voltage mode driver, including a second pair of transistors that is configured to receive a low-power differential data signal, wherein the first pair of transistors and the second pair of transistors are coupled in series between rails of a power supply, wherein the high-speed differential data signal encodes data in a first mode of operation and enables a first driver slice of the voltage mode driver in a second mode of operation, and wherein the low-power differential data signal encodes data in the second mode of operation and enables the first driver slice of the voltage mode driver in the first mode of operation.

9. The apparatus as described in clause 8, wherein the means for providing the high-speed signaling path through the voltage mode driver further includes a third pair of transistors that is configured to receive a gated version of the high-speed differential data signal, wherein the means for providing the low-power signaling path through the voltage mode driver further includes a fourth pair of transistors that is configured to receive a gated version of the low-power differential data signal, wherein the third pair of transistors and the fourth pair of transistors are coupled in series and further coupled in parallel with the first pair of transistors and the second pair of transistors, wherein the gated version of the high-speed differential data signal enables a second driver slice of the voltage mode driver in the second mode of operation, and wherein the gated version of the low-power differential data signal enables the second driver slice of the voltage mode driver in the first mode of operation.

10. The apparatus as described in clause 8 or clause 9, wherein the high-speed differential data signal or the low-power differential data signal disables the first driver slice of the voltage mode driver in a third mode of operation.

11. The apparatus as described in any of clauses 8-10, wherein an electrostatic discharge protection circuit is coupled to the output of the first driver slice.

12. The apparatus as described in any of clauses 8-11, wherein the voltage mode driver is coupled to a serializer configured to encode data in the high-speed differential data signal.

13. The apparatus as described in any of clauses 8-12, wherein the voltage mode driver is coupled to a serializing circuit configured to encode data in the low-power differential data signal.

14. A method for operating a voltage mode driver circuit, comprising: providing a first version of a first data signal to a gate of a first transistor that is provided in a pullup structure coupled to an output of a first driver slice of the voltage mode driver circuit; providing a first version of a second data signal to a gate of a second transistor that is provided in the pullup structure; providing a second version of the first data signal to a gate of a third transistor that is provided in a pulldown structure coupled to the output of the first driver slice; providing a second version of the second data signal to a gate of a fourth transistor that is provided in the pulldown structure; using the first data signal to encode data in a first mode of operation and to enable or disable the pullup structure and the pulldown structure in a second mode of operation; and using the second data signal to encode data in the second mode of operation and to enable or disable the pullup structure and the pulldown structure in the first mode of operation.

15. The method as described in clause 14, wherein a second driver slice of the voltage mode driver circuit includes a pullup structure responsive to an in-phase version of the first data signal and an in-phase version of the second data signal, and a pulldown structure responsive to a quadrature version of the first data signal and a quadrature version of the second data signal, and wherein an output of the second driver slice is coupled to the output of the first driver slice.

16. The method as described in clause 14 or clause 15, wherein an electrostatic discharge protection circuit is coupled to the output of the first driver slice.

17. The method as described in any of clauses 14-16, further comprising: using a first serializer to provide the first data signal based on timing provided by a first clock signal generated by a first clock generator; and using a second serializer to provide the second data signal based on timing provided by a second clock signal generated by a second clock generator.

18. The method as described in any of clauses 14-17, wherein the first data signal is gated by an enable signal during the second mode of operation, wherein the second data signal is gated by the enable signal during the first mode of operation, and wherein the enable signal determines whether the pullup structure and the pulldown structure are to be disabled in a current mode of operation.

19. The method as described in any of clauses 14-18, wherein data is transmitted by the voltage mode driver circuit at a higher data rate in the first mode than in the second mode of operation.

20. The method as described in clause 19, wherein data is transmitted by the voltage mode driver circuit at 18 gigabits per second in the first mode of operation and at 9 gigabits per second in the second mode of operation.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A voltage mode driver circuit comprising a first driver slice that includes:
   a first transistor, provided in a pullup structure that is coupled to an output of the first driver slice, the first transistor having a gate configured to receive a first version of a first data signal;
   a second transistor, provided in the pullup structure, the second transistor having a gate configured to receive a first version of a second data signal;
   a third transistor, provided in a pulldown structure that is coupled to the output of the first driver slice, the third transistor having a gate configured to receive a second version of the first data signal that is a complement of the first version of the first data signal; and a fourth transistor, provided in the pulldown structure, the fourth transistor having a gate configured to receive a second version of the second data signal that is a complement of the first version of the second data signal, wherein the first data signal encodes data in a first mode of operation and enables or disables the pullup structure and the pulldown structure in a second mode of operation, wherein the second data signal encodes data in the second mode of operation and enables or disables the pullup structure and the pulldown structure in the first mode of operation, a first serializer configured to provide the first data signal based on timing provided by a first clock signal generated by a first clock generator; and a second serializer configured to provide the second data signal based on timing provided by a second clock signal generated by a second clock generator.

2. The voltage mode driver circuit of claim 1, further comprising:

a second driver slice that includes a pullup structure responsive to an in-phase version of the first data signal and an in-phase version of the second data signal, and a pulldown structure responsive to a quadrature version of the first data signal and a quadrature version of the second data signal, wherein an output of the second driver slice is coupled to the output of the first driver slice.

3. The voltage mode driver circuit of claim 1, further comprising:

an electrostatic discharge protection circuit coupled to the output of the first driver slice.

4. A voltage mode driver circuit comprising a first driver slice that includes:

a first transistor, provided in a pullup structure that is coupled to an output of the first driver slice, the first transistor having a gate configured to receive a first version of a first data signal;

a second transistor, provided in the pullup structure, the second transistor having a gate configured to receive a first version of a second data signal;

a third transistor, provided in a pulldown structure that is coupled to the output of the first driver slice, the third transistor having a gate configured to receive a second version of the first data signal that is a complement of the first version of the first data signal; and a fourth transistor, provided in the pulldown structure, the fourth transistor having a gate configured to receive a second version of the second data signal that is a complement of the first version of the second data signal, wherein the first data signal encodes data in a first mode of operation and enables or disables the pullup structure and the pulldown structure in a second mode of operation, wherein the second data signal encodes data in the second mode of operation and enables or disables the pullup structure and the pulldown structure in the first mode of operation, and wherein the first data signal is gated by an enable signal during the second mode of operation, wherein the second data signal is gated by the enable signal during the first mode of operation, and wherein the enable signal determines whether the pullup structure and the pulldown structure are to be disabled in a current mode of operation.

5. The voltage mode driver circuit of claim 1, wherein data is transmitted by the voltage mode driver circuit at a higher data rate in the first mode than in the second mode of operation.

6. The voltage mode driver circuit of claim 5, wherein data is transmitted by the voltage mode driver circuit at 18 gigabits per second in the first mode of operation and at 9 gigabits per second in the second mode of operation.

7. A method for operating a voltage mode driver circuit, comprising:

providing a first version of a first data signal to a gate of a first transistor that is provided in a pullup structure coupled to an output of a first driver slice of the voltage mode driver circuit;

providing a first version of a second data signal to a gate of a second transistor that is provided in the pullup structure;

providing a second version of the first data signal to a gate of a third transistor that is provided in a pulldown structure coupled to the output of the first driver slice;

providing a second version of the second data signal to a gate of a fourth transistor that is provided in the pulldown structure;

using the first data signal to encode data in a first mode of operation and to enable or disable the pullup structure and the pulldown structure in a second mode of operation;

using the second data signal to encode data in the second mode of operation and to enable or disable the pullup structure and the pulldown structure in the first mode of operation;

using a first serializer to provide the first data signal based on timing provided by a first clock signal generated by a first clock generator; and using a second serializer to provide the second data signal based on timing provided by a second clock signal generated by a second clock generator.

8. The method of claim 7, wherein a second driver slice of the voltage mode driver circuit includes a pullup structure responsive to an in-phase version of the first data signal and an in-phase version of the second data signal, and a pulldown structure responsive to a quadrature version of the first data signal and a quadrature version of the second data signal, and wherein an output of the second driver slice is coupled to the output of the first driver slice.

9. The method of claim 7, wherein an electrostatic discharge protection circuit is coupled to the output of the first driver slice.

10. The method of claim 7, wherein the first data signal is gated by an enable signal during the second mode of operation, wherein the second data signal is gated by the enable signal during the first mode of operation, and wherein the enable signal determines whether the pullup structure and the pulldown structure are to be disabled in a current mode of operation.

11. The method of claim 7, wherein data is transmitted by the voltage mode driver circuit at a higher data rate in the first mode than in the second mode of operation.

12. The method of claim 11, wherein data is transmitted by the voltage mode driver circuit at 18 gigabits per second in the first mode of operation and at 9 gigabits per second in the second mode of operation.

13. The voltage mode driver circuit of claim 4, further comprising:

a second driver slice that includes a pullup structure responsive to an in-phase version of the first data signal and an in-phase version of the second data signal, and a pulldown structure responsive to a quadrature version of the first data signal and a quadrature version of the second data signal, wherein an output of the second driver slice is coupled to the output of the first driver slice.

14. The voltage mode driver circuit of claim 4, further comprising:

an electrostatic discharge protection circuit coupled to the output of the first driver slice.

* * * * *